United States Patent
Oyama

(10) Patent No.: US 8,010,125 B2
(45) Date of Patent: Aug. 30, 2011

(54) CALL SYSTEM

(75) Inventor: Takuji Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1059 days.

(21) Appl. No.: 11/493,391

(22) Filed: Jul. 26, 2006

(65) Prior Publication Data

US 2007/0178904 A1 Aug. 2, 2007

(30) Foreign Application Priority Data

Jan. 31, 2006 (JP) .................................. 2006-023383

(51) Int. Cl.
H04W 64/00 (2009.01)

(52) U.S. Cl. ..................... 455/456.1; 455/433; 455/446; 455/445

(58) Field of Classification Search .................. 455/455, 455/456.5, 456.1, 445, 433, 434, 432.1, 432.3, 455/435.1, 422.1, 426.1, 446; 370/349, 338, 370/332

See application file for complete search history.

(56) References Cited

U.S. PATENT DOCUMENTS

| 6,147,971 | A  | * | 11/2000 | Rochberger et al. | ......... 370/238 |
| 6,810,259 | B1 | * | 10/2004 | Zhang | ......... 455/456.5 |
| 7,286,520 | B2 | * | 10/2007 | Takeda et al. | ......... 370/349 |
| 2001/0051525 | A1 | * | 12/2001 | Rayne | ......... 455/453 |
| 2002/0105922 | A1 | * | 8/2002 | Jabbari et al. | ......... 370/328 |
| 2004/0203894 | A1 |  | 10/2004 | Watanabe et al. | |
| 2004/0267939 | A1 | * | 12/2004 | Yumoto et al. | ......... 709/227 |
| 2005/0004931 | A1 | * | 1/2005 | Kihara et al. | ......... 707/102 |
| 2005/0198372 | A1 | * | 9/2005 | Narayanan et al. | ......... 709/238 |

FOREIGN PATENT DOCUMENTS

| JP | 2004-201316 | 7/2004 |
| JP | 2004-274602 | 9/2004 |
| JP | 2004-328104 | 11/2004 |

OTHER PUBLICATIONS

Notice of Reason for Rejection dated Jul. 13, 2010, from the corresponding Japanese Application.

* cited by examiner

Primary Examiner — John J Lee
(74) Attorney, Agent, or Firm — Katten Muchin Rosenman LLP

(57) ABSTRACT

Provided is a technology by which a relay node relaying communications of a terminal detects a movement of the terminal and updates, as triggered by this movement of the terminal, information of a call processing device, thereby shortening a (period of) status in which a location of the terminal remains not to be coincident with location information registered in the call processing device. A system of the invention has a call control device performing call control between terminals on the basis of location information of the terminals, a location management device managing information about locations of the terminals and a relay node relaying communications of the terminals, wherein the relay node detects a connecting status with the terminal, and, when the connecting status with the terminal is changed, notifies the call control device of an update of the location information through the location management device.

24 Claims, 20 Drawing Sheets

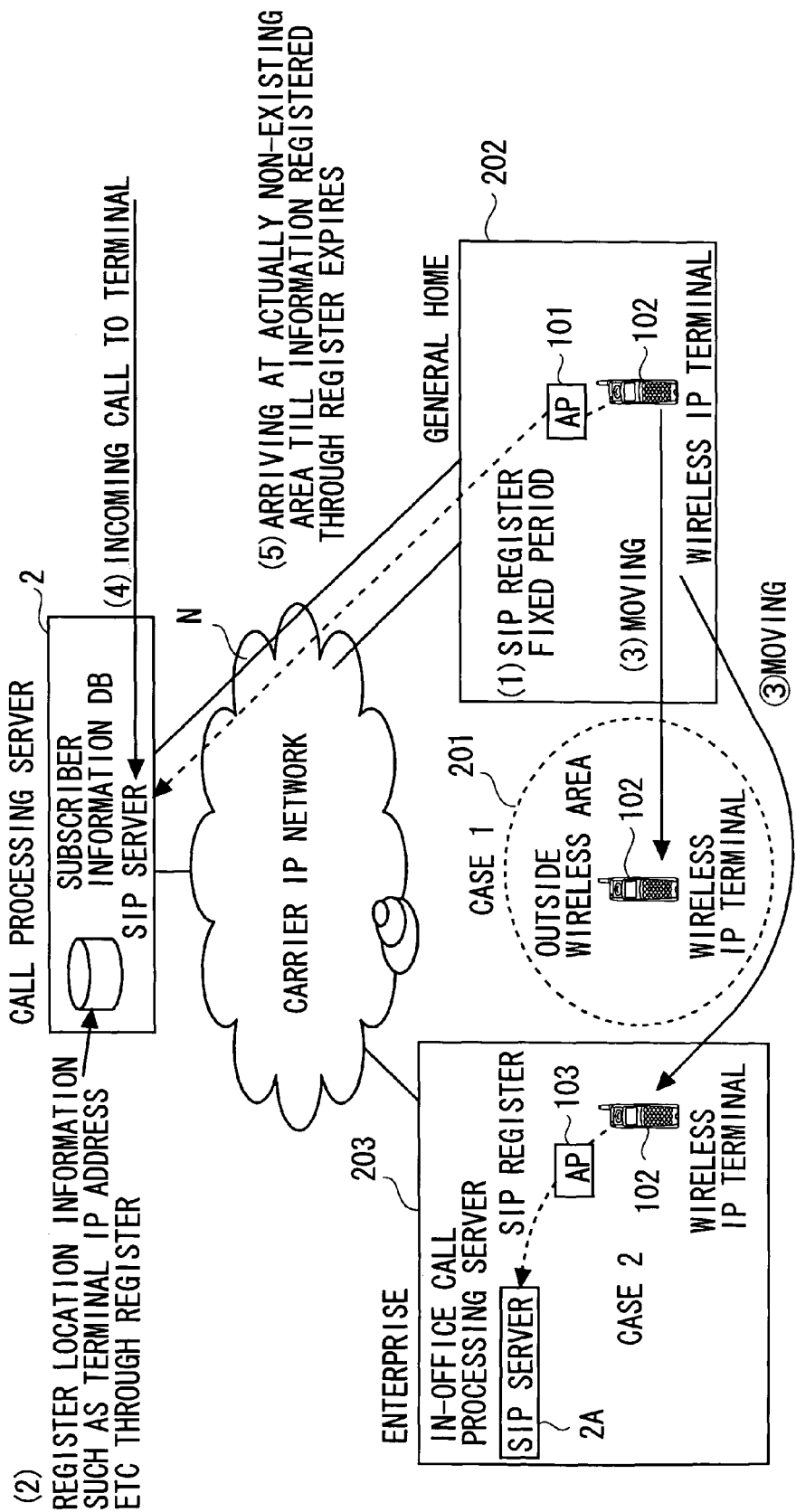

CALL SYSTEM

BACKGROUND OF THE INVENTION

The invention relates to a technology of updating location information for setting up a call between communication terminals.

Over the recent years, so-called IP phones have spread, wherein a call is set up between communication terminals via an IP network such as the Internet, and the communication terminals converse with each other by transmitting and receiving voice packets based on Internet Protocol (IP).

In an IP telephony system, the communication terminal sends a Register message (REGISTER) defined as a location registration request to a Registrar as one of components of an SIP (Session Initiation Protocol) server that performs call control, and the Registrar accepts the request and registers the location information such as an IP address of the terminal in a subscriber information DB of the SIP server. The SIP server executes a call process such as transmitting and receiving a call on the basis of the information registered in the subscriber information DB.

Further, for instance, a technology disclosed in the following Patent document 1 is given by way of the prior art related to the invention of the present application.

[Patent document 1] Japanese Patent Application Laid-Open Publication No. 2004-274602

SUMMARY OF THE INVENTION

In the IP telephony system, on the occasion of designating a callee terminal by a telephone number and then phoning this terminal, the SIP server specifies the callee terminal on the basis of the location registration made by the Registrar and sets up the call between a caller terminal and the callee terminal.

Note that it is when the terminal makes re-registration via the Registrar or when the Register information is invalidated (Expire) and disappears without being updated for a predetermined period of time that the Register information once registered in the subscriber information DB of the SIP server is updated.

Accordingly, in the case of moving the terminal, there is a time lag till this information is reflected in the subscriber information DB. Hence, there is no problem in the case of a fixed type of terminal connected via a cable to a network, however, a mobile type of terminal wirelessly connected to the network might have occurrence of problems in the following two cases.

<Case 1: Case of Moving Outside Wireless Area>

A case 1 is that a terminal 102 connecting to a network N via an access point 101 of a wireless LAN, after making location registration through Register (message) in the SIP server 2, moves to a radio-wave-unreachable area 201 of the access point 101.

In this case 1, if there is an incoming call addressed to the terminal 102 for a period till the Register information registered is invalidated (Expire), the SIP server 2 performs the call control based on the Register information registered and therefore attempts to get the call reached on the assumption that the terminal 102 is kept connecting to the access point 101 in spite of the terminal 102 being in an unable-to-communicate status (FIG. 20).

<Case 2: Case of Moving to Different Network>

A case 2 is that when a user having the terminal 102 stays in a home 202, and, after the terminal 102 has made the location registration through the Register in the SIP server 2 existing in a carrier network N, the user moves to an enterprise 203 and connects the terminal 102 to a different network.

In this case 2, the terminal 102 makes the location registration through the Register in the SIP server 2A executing an in-office call process within the enterprise, however, the SIP server 2 has the remaining Register information registered before the terminal 102 moves, so that the SIP server 2, when having an incoming call addressed to the terminal 102, attempts to get the call reached for a period till this Register information is invalidated (Expire) on the assumption that the terminal 102 exists in the home 202 in spite of the terminal staying within the enterprise (FIG. 1).

For solving this problem, if the time for making the location registration from the terminal is shortened, an update period of the subscriber information DB decreases, and it is possible to reduce a (period of) status where the actually existing location of the terminal gets non-coincident with the Register information registered in the SIP server 2, however, it is undesirable that a large load is applied onto the SIP server 2 because of an increase in the number of times with which the terminal 102 makes the location registration in the SIP server 2.

Such being the case, the invention provides a technology by which a relay node relaying communications of the terminal 102 detects a movement of the terminal 102 as the access point 101 does and updates, as triggered by the movement of this terminal 102, information of the SIP server (a call processing device) 2, thereby shortening the (period of) status in which the location of the terminal 102 remains not to be coincident with the location information registered in the SIP server 2.

The invention adopts the following configurations in order to solve the problems given above.

Namely, a call system of the invention comprises a call control device performing call control between terminals on the basis of location information of the terminals, and a relay node relaying communications of the terminals, the relay node including:
  connection detecting means detecting a connecting status with the terminal; and
  notifying means notifying, if the connecting status with the terminal is changed, the call control device of an update of the location information.

The call system may further comprise a location management device managing the location information of the terminals,
  wherein the location management device may include:
  receiving means receiving the connecting status of the terminal from the relay node;
  location management means judging based on the connecting status of the terminal whether a connecting location of the terminal moves or not; and
  update notifying means notifying, when the terminal moves, the call control device of an update of the location information, and
  wherein the notifying means of the relay node may notify the location management device of the connecting status with the terminal, and the update notifying means of the location management device may be thereby made to notify the call control device of the update of the location information.

If the receiving means of the location management device receives cancellation of the connection of the terminal, the update notifying means may notify the call control device of invalidity of the location information registered by the terminal.

The location management device may manage registration information representing whether the location information of the terminal is registered in the call control device or not and information about the connecting status of the terminal in a way that associates these items of information with each other, and the update notifying means, if the connection with the terminal making a location registration request is canceled, may notify of this cancellation.

When the location management device receives, from the relay node, the notification purporting that the connection to the terminal is established, the update notifying means may notify the call control device of the update of the location information.

A relay node, of the invention, relaying communications of a terminal subjected to call control by a call control device on the basis of location information of terminals, comprises:

connection detecting means detecting a connecting status with the terminal; and notifying means notifying, if the connecting status with the terminal is changed, the call control device of an update of the location information.

The notifying means may notify a location management device managing the location information of the terminals, of the connecting status with the terminal, and the location management device may be thereby made to notify the call control device of the update of the location information.

In the relay node, if cancellation of the connection with the terminal is detected, the notifying means may notify the call control device of invalidity of the location information registered by the terminal.

The relay node may further comprise request detecting means detecting a location registration request given to the call control device from the terminal, wherein if the connection with the terminal making the location registration request is canceled, the notifying means may notify of this cancellation.

In the relay node, when connecting to the terminal, the notifying means may notify the call control device of an update of the location information.

Further, a communication method, of the invention, executed by a relay node relaying communications of a terminal subjected to call control by a call control device on the basis of location information of the terminals, comprises:

a step of detecting a connecting status with the terminal; and a step of notifying, if the connecting status with the terminal is changed, the call control device of an update of the location information.

In the communication method, on the occasion of notifying, a location management device managing the location information of the terminals may be notified of the connecting status with the terminal, and the location management device may be thereby made to notify the call control device of the update of the location information.

In the communication method, if cancellation of the connection with the terminal is detected, the call control device may be notified of invalidity of the location information registered by the terminal by way of a notification of the update.

In the communication method, when detecting the location registration request given to the call control device from the terminal and when the connection with the terminal making the location registration request is canceled, a notification of the location information may be given.

In the communication method, when connecting to the terminal, the call control device may be notified of an update of the location information.

Moreover, a communication method, of the invention, executed by a location management device managing information on locations of terminals, comprises:

a step of receiving a connecting status of the terminal from a relay node;

a step of judging based on the connecting status of the terminal whether a connecting location of the terminal moves or not; and a step of notifying, when the terminal moves, a call control device of an update of the location information.

In the communication method of the location management device, when receiving cancellation of the connection of the terminal, a notification of invalidity of the location information registered by the terminal may be given as an update notification.

In the communication method of the location management device, registration information showing whether or not the location information of the terminal is registered in a call control device and information on a connecting status of the terminal may be managed (stored) in a way that associates these items of information, and, if the connection with the terminal making a location registration request is canceled, the update notification may be given.

In the communication method of the location management device, when receiving from the relay node a notification purporting that the terminal is connected, the call control device may be notified of an update of the location information.

Further, the invention may be a program for making a computer execute the communication method. Still further, the invention may also be a readable-by-computer recording medium recorded with this program. The computer is made to read and execute the program on this recording medium, thereby making it possible to provide functions thereof.

Herein, the recording medium readable by the computer connotes a recording medium capable of accumulating information such as data and programs electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc are given as those demountable from the computer.

Further, a hard disc, a ROM (Read-Only Memory), etc are given as the recording mediums fixed within the computer.

Effects of the Invention

The invention provides a technology by which the relay node relaying communications of the terminal detects the movement of the terminal and updates, as triggered by this movement of the terminal, the information of the call processing device, thereby shortening the (period of) status in which the location of the terminal remains not to be coincident with the location information registered in the call processing device.

BRIEF DESCRIPTION OF THE DRAWINGS

FIG. 20 is an explanatory diagram of a background art.

DETAILED DESCRIPTION OF THE PREFERRED EMBODIMENT

First Embodiment

Figure 1:
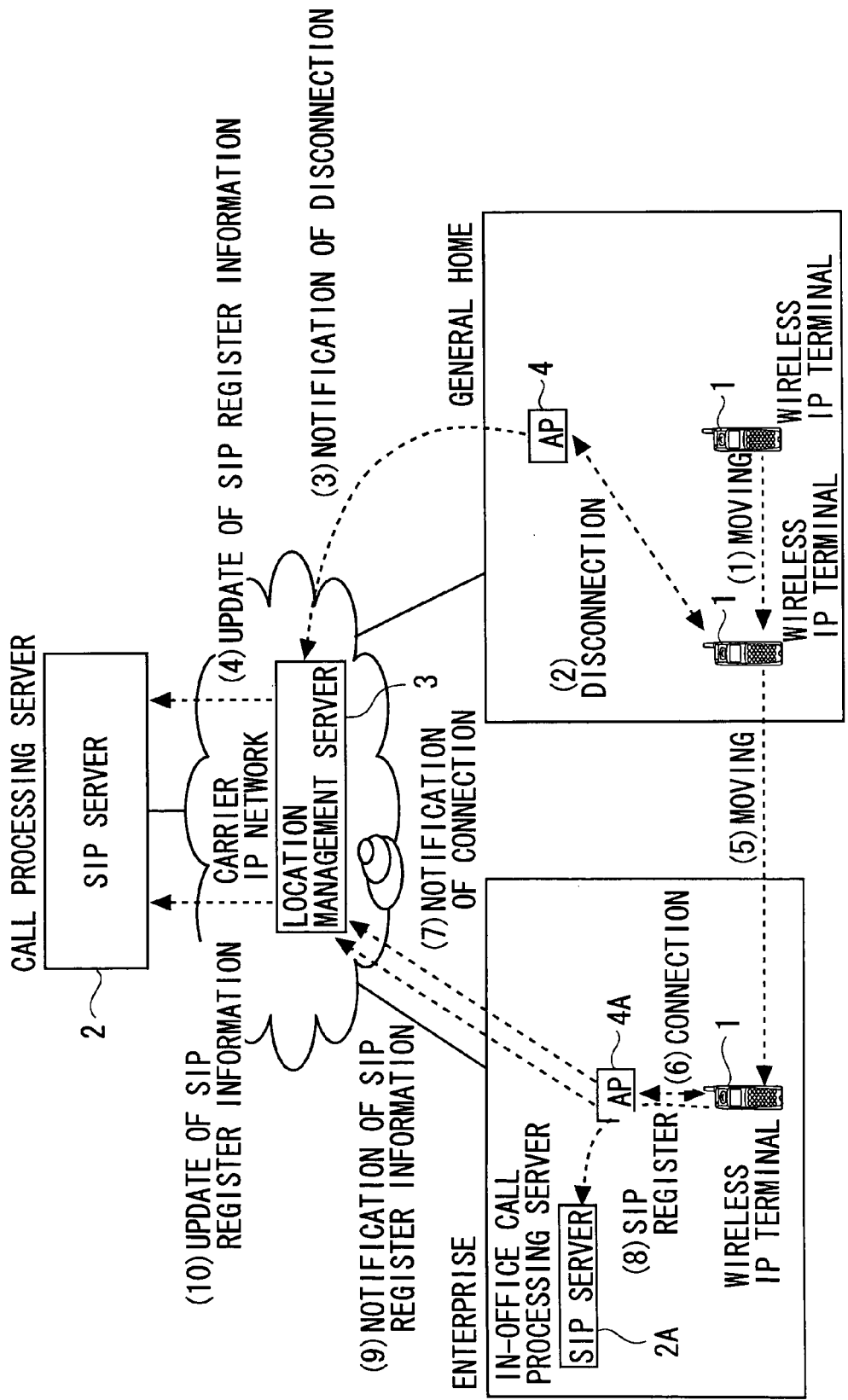
FIG. 1 is a diagram of a whole IP telephony system according to the invention.
Figure 2:
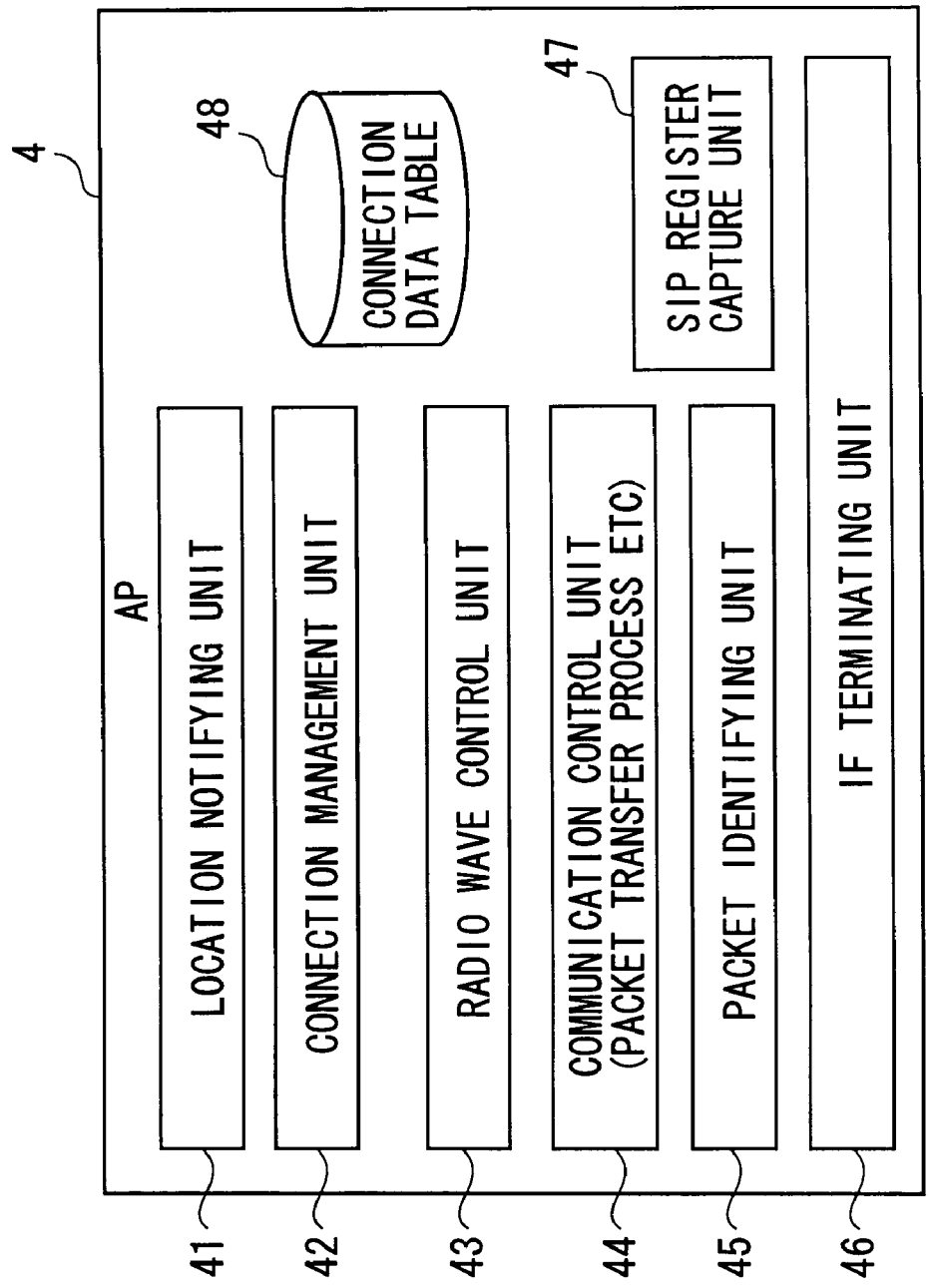
FIG. 2 is a function block diagram of an access point.
Figure 3:
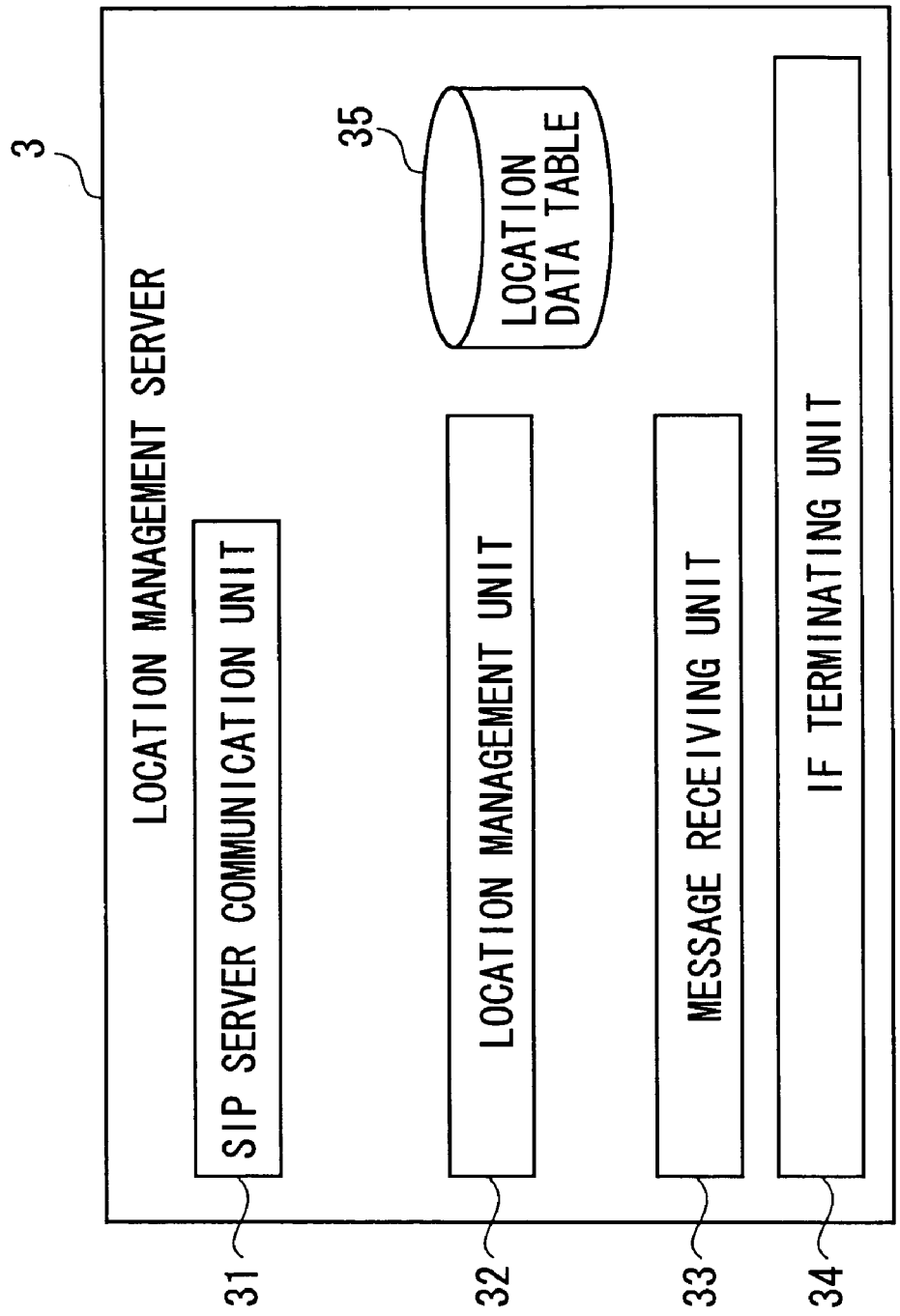
FIG. 3 is a function block diagram of a location management server.
Figure 4:
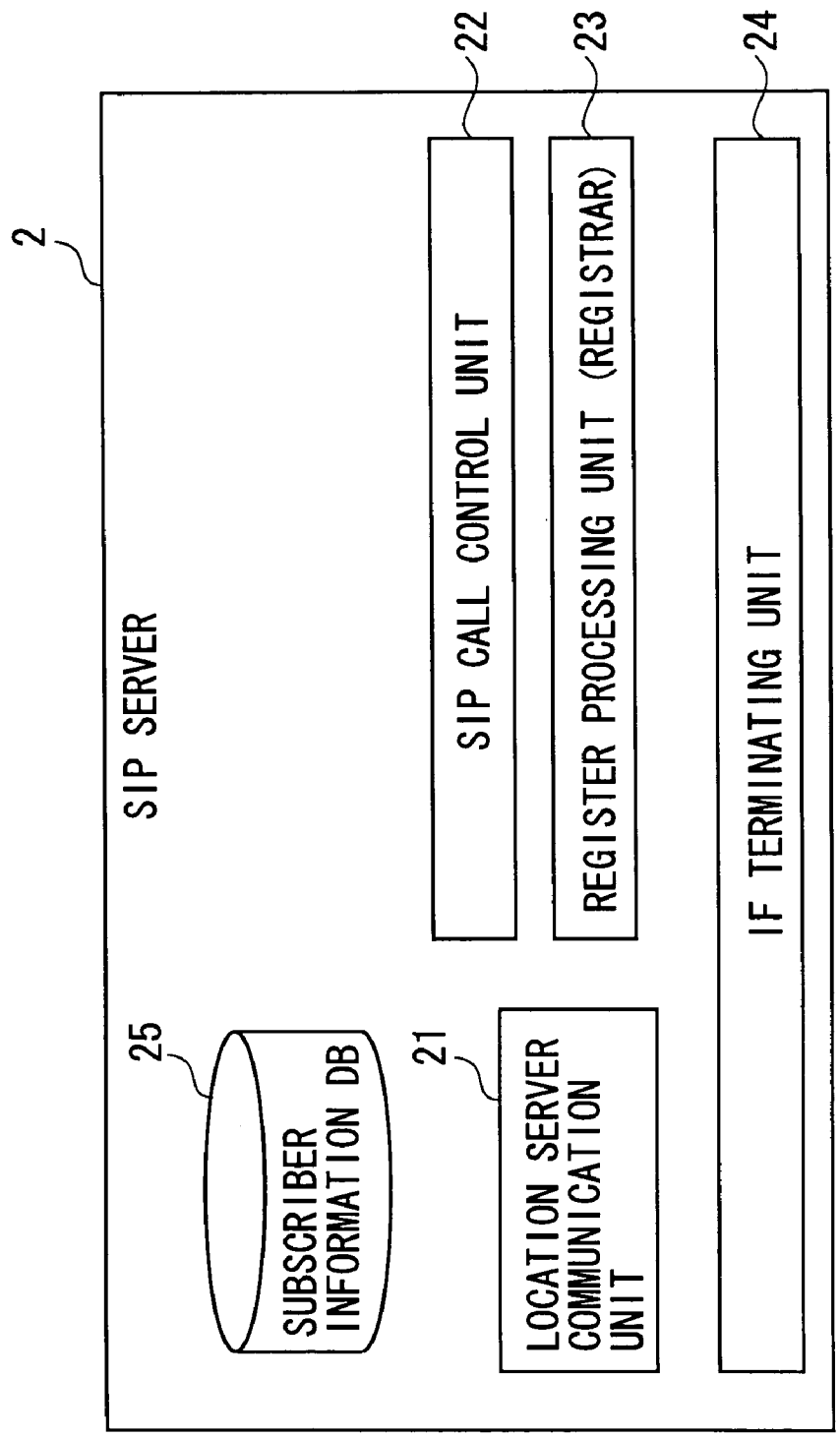
FIG. 4 is a function block diagram of an SIP server.

A first embodiment of the invention will be described with reference to FIGS. 1 through 19. FIG. 1 shows a whole configuration in the first embodiment, and FIGS. 2, 3 and 4 illustrate configurations of respective devices building up the system in the first embodiment.

As shown in FIG. 1, an IP (Internet Protocol) telephony system (a call system) in the first embodiment includes a SIP (Session Initiation Protocol) server (a call control device) 2 for controlling calls between terminals on the basis of location information of terminals 1, a location management server (a location management device) 3 that manages information on locations of the terminals 1, and a relay node (an access point) 4 that relays communications between the terminals 1. The IP telephony system is a system by which voice data (packets) communications, i.e., phone calls, are performed between the terminals via networks N such as the Internet and Intranets on the basis of Internet Protocol (IP).

The relay node 4 in the first embodiment is a wireless LAN (Local Area Network) access point (which will simply be called an access point for the explanatory convenience) via which the wireless LAN terminal 1 is connected to a wired network. The access point 4 includes, as illustrated in FIG. 2, a location notifying unit (corresponding to communication means) 41, a connection management unit (corresponding to connection detecting means) 42, a radio wave control unit 43, a communication control unit (packet transfer processing etc) 44, a packet identifying unit 45, an IF terminating unit 46, a SIP Register capture unit 47, and a connection data table 48.

The connection management unit 42 detects a connecting status with the terminal 1, and manages the connecting status in a way that registers this connecting status in the connection data table 48.

The location notifying unit 41, when the connecting status with the terminal 1 is changed, notifies an SIP server 2 of an update of the location information via the location management server 3.

The respective units of the access point 4 in the first embodiment are constructed of pieces of hardware (electronic circuits), however, such a configuration may also be taken that a computer (an information processing device) actualizes functions of the individual units in accordance with software (a communication program according to the invention) without being limited to this hardware configuration.

Further, the location management server 3 is a general-purpose computer including an arithmetic processing unit (a CPU etc) and a storage unit (a hard disk, a RAM etc). The storage unit is preinstalled with programs such as an operating system (OS) and application software and has a location data table 35 stored with information about the connecting status of every terminal.

Then, in the location management server 3, the arithmetic processing unit executes processes in accordance with the programs preinstalled into the storage unit. Through this execution, the arithmetic processing unit, as shown in FIG. 3, functions as an SIP server communication unit (or module) (corresponding to update notifying means) 31, the location management unit (or module) (corresponding to location management means) 32, the message receiving unit (or module) (corresponding to receiving means) 33 and the IF terminating unit (or module) 34.

The message receiving unit 33 receives the connecting status of the terminal 1 from the access point 4.

The location management unit 32 judges based on the connecting status of the terminal 1 whether a connecting location of the terminal 1 moves or not.

The SIP communication unit 31, when the terminal 1 moves, notifies the SIP server 2 of an update of the location information.

Further, the SIP server 2 is a general-purpose computer including an arithmetic processing unit (a CPU etc) and a storage unit (a hard disk, a RAM etc). The storage unit is preinstalled with programs such as an operating system (OS) and application software and has a subscriber information database (DB) 25 stored with information about the connecting status of every terminal.

Then, in the SIP server 2, the arithmetic processing unit executes processes in accordance with the programs preinstalled into the storage unit. Through this execution, the arithmetic processing unit, as shown in FIG. 4, functions as a location server communication unit (or module) 21, an SIP call control unit (or module) 22, a register processing unit (or module) 23 and an IF terminating unit (or module 24).

The functions of the respective units of the location management server 3 and the SIP server 2 in the first embodiment are actualized by the arithmetic processing unit according to the programs (software), however, such a configuration may also be taken that the functions of the individual units are executed by use of the hardware (electronic circuits) as the respective units without being limited to this software configuration.

Figure 5:
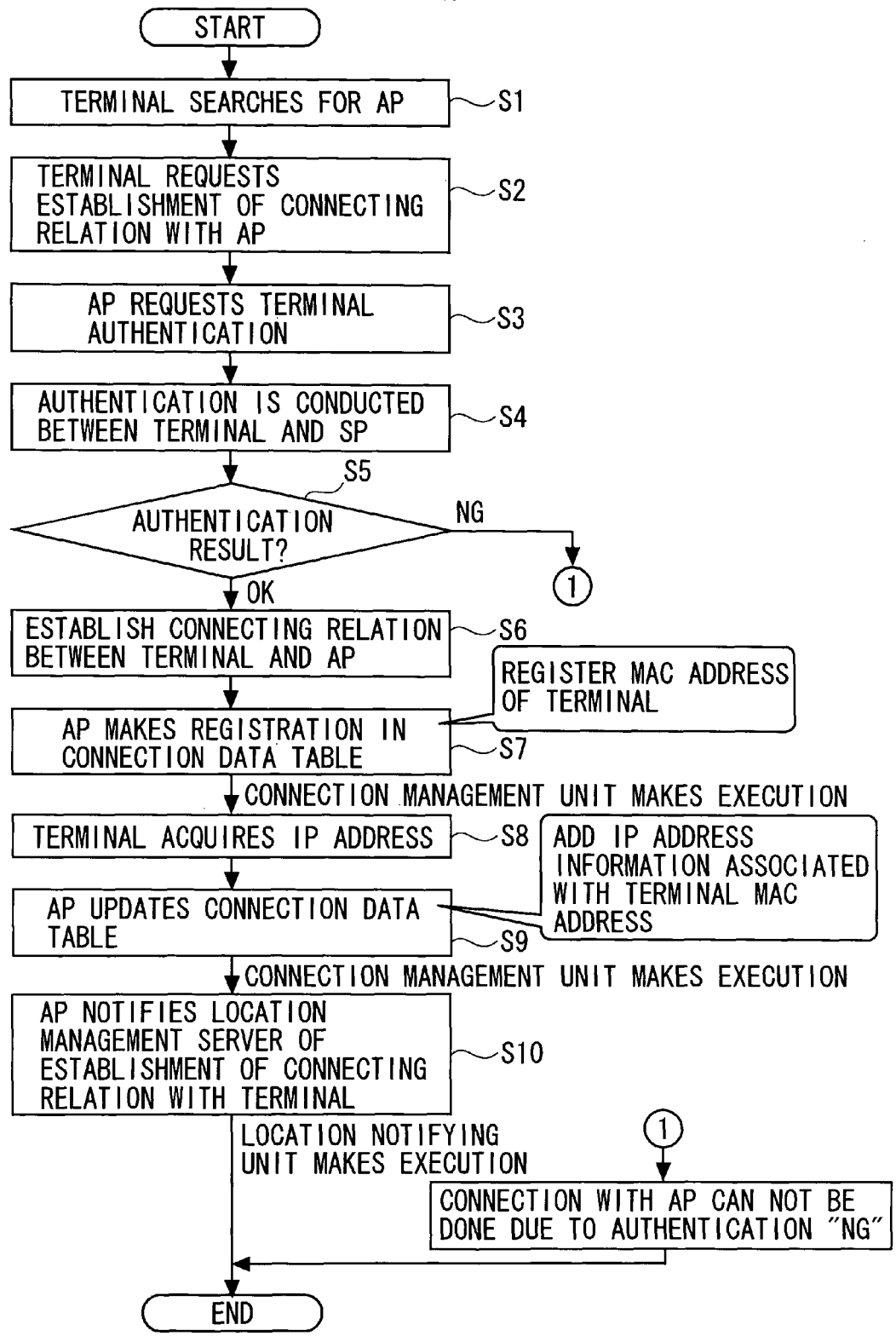
FIG. 5 is a flowchart showing a process related to a notification of a connecting status.
Figure 6:
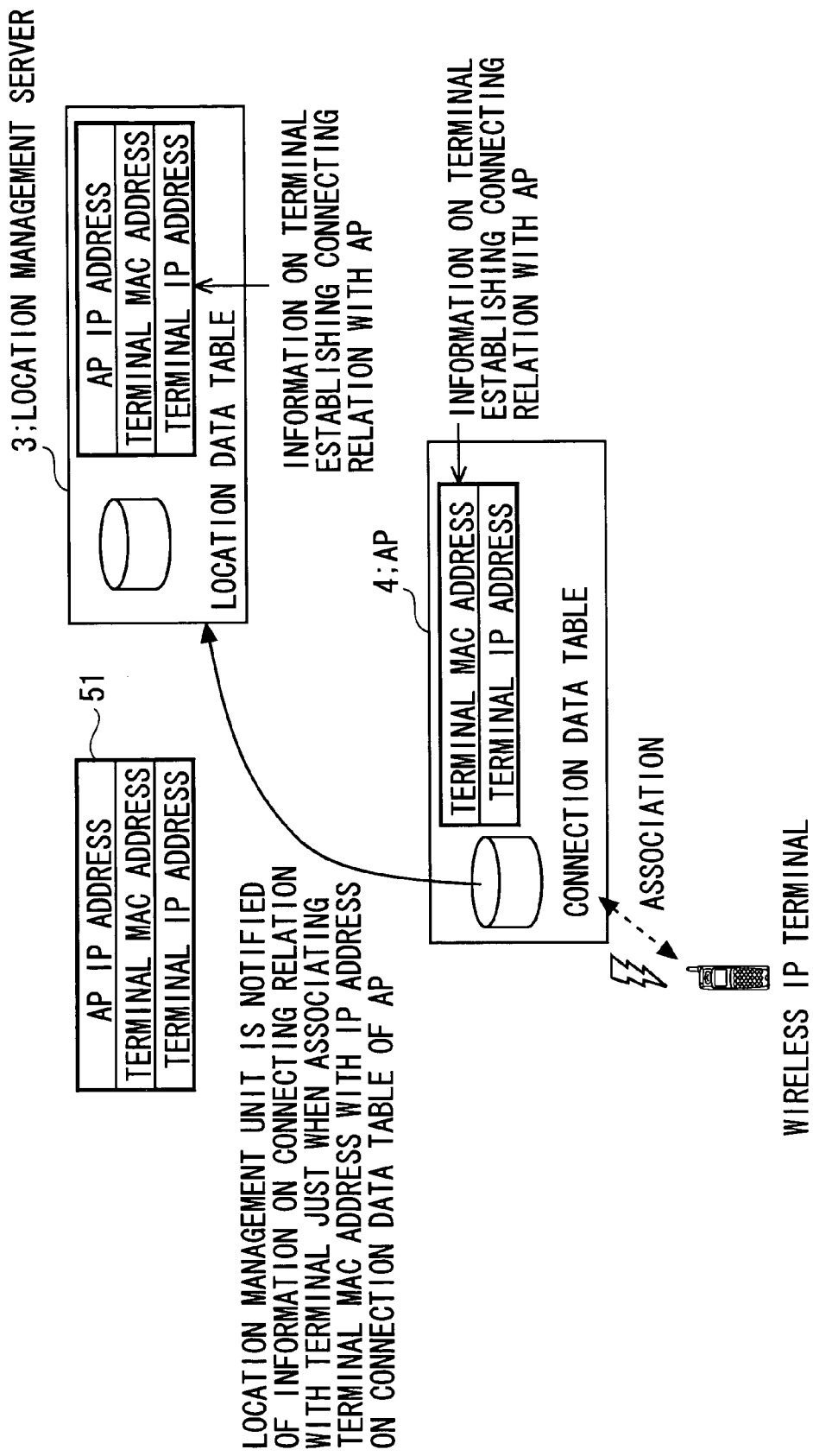
FIG. 6 is an explanatory diagram of notifying of the connecting status of the terminal.

FIG. 5 shows a sequence in which the access point 4, in the IP telephony system configured by these devices in the first embodiment, starts with establishing a connecting relation with the terminal 1 and ends with notifying the location management server of connecting information of the terminal 1. Further, FIG. 6 illustrates an outline of the operation at that time.

When the terminal 1 enters a wireless area covered by the access point 4, the terminal 1 searches for the access point 4 (step 1, which will hereinafter be also abbreviated to such as S1) and issues an association request to the access point 4 in order to establish the connecting relation (S2).

In response to this association request, the access point 4 requests the terminal 1 for authentication information such as an ID and an authentication key (S3). When receiving the authentication information from the terminal 1, the access point 4 authenticates the terminal 1 on the basis of the authentication information (S4-S5).

Upon a pass of the authentication of the terminal 1, the access point 4 establishes the connecting relation with the terminal 1 (S6). At this time, the connection management unit 42 registers MAC address information of the connected terminal 1 in a connection data table 48 (S7).

The terminal 1, upon connecting to the access point 4, acquires an IP address by use of DHCP (Dynamic Host Configuration Protocol), thereby entering an IP-communications-enabled status (S8).

Then, the access point 4 associates the IP address acquired by the terminal 1, i.e., the location information of the terminal 1 on the network with the MAC address (address mapping), and the connection management unit 42 registers this address mapping in the connection data table 48 (S9). Based on the information in this connection data table 48, the access point 4 relays the communications related to the terminal 1.

After registering the MAC address and the IP address, the location notifying unit 41 of the access point 4 associates the MAC address, the terminal IP address and an IP address of the access point 4 with each other, and notifies the location management server 3 of this address mapping as connecting information 51 with the terminal 1, and notifies the location management server 3 of this connecting information 51 (S10).

Figure 7:
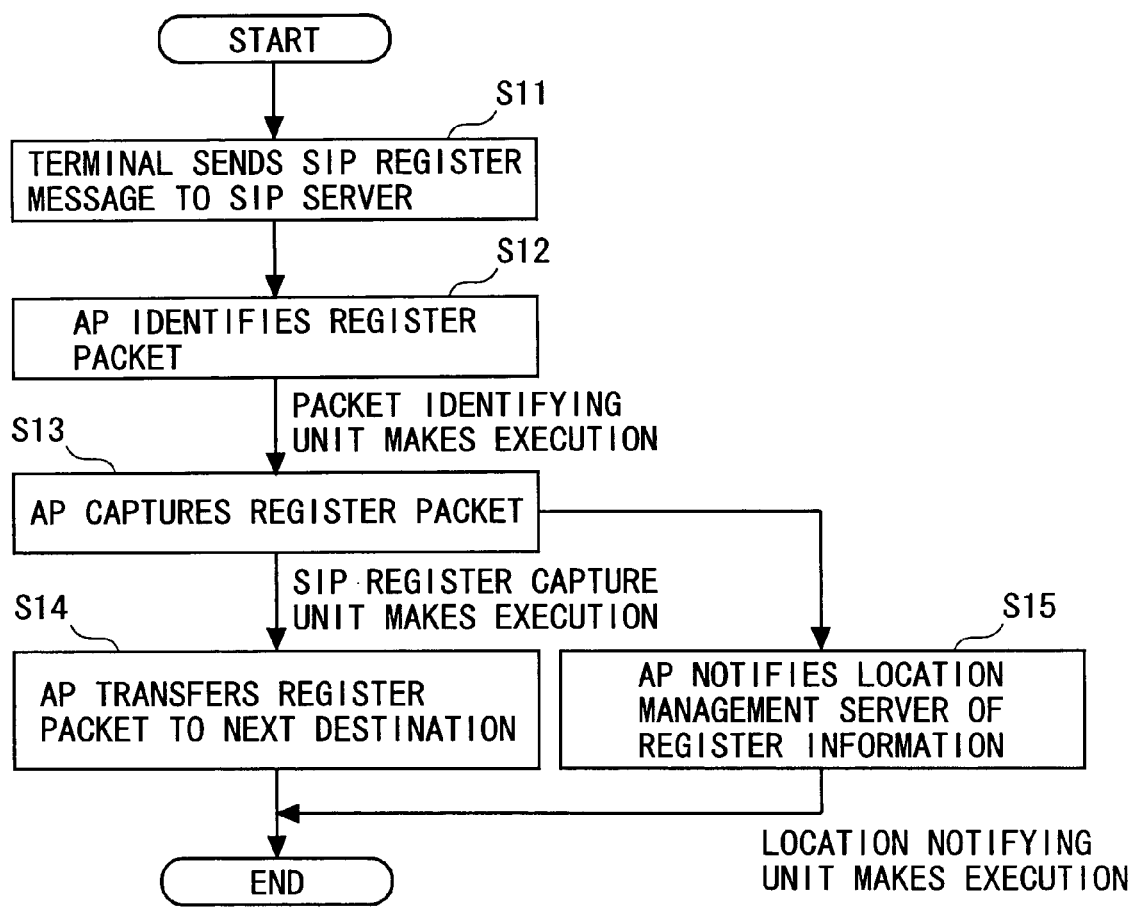
FIG. 7 is a flowchart showing a process related to a notification of location information.
Figure 8:
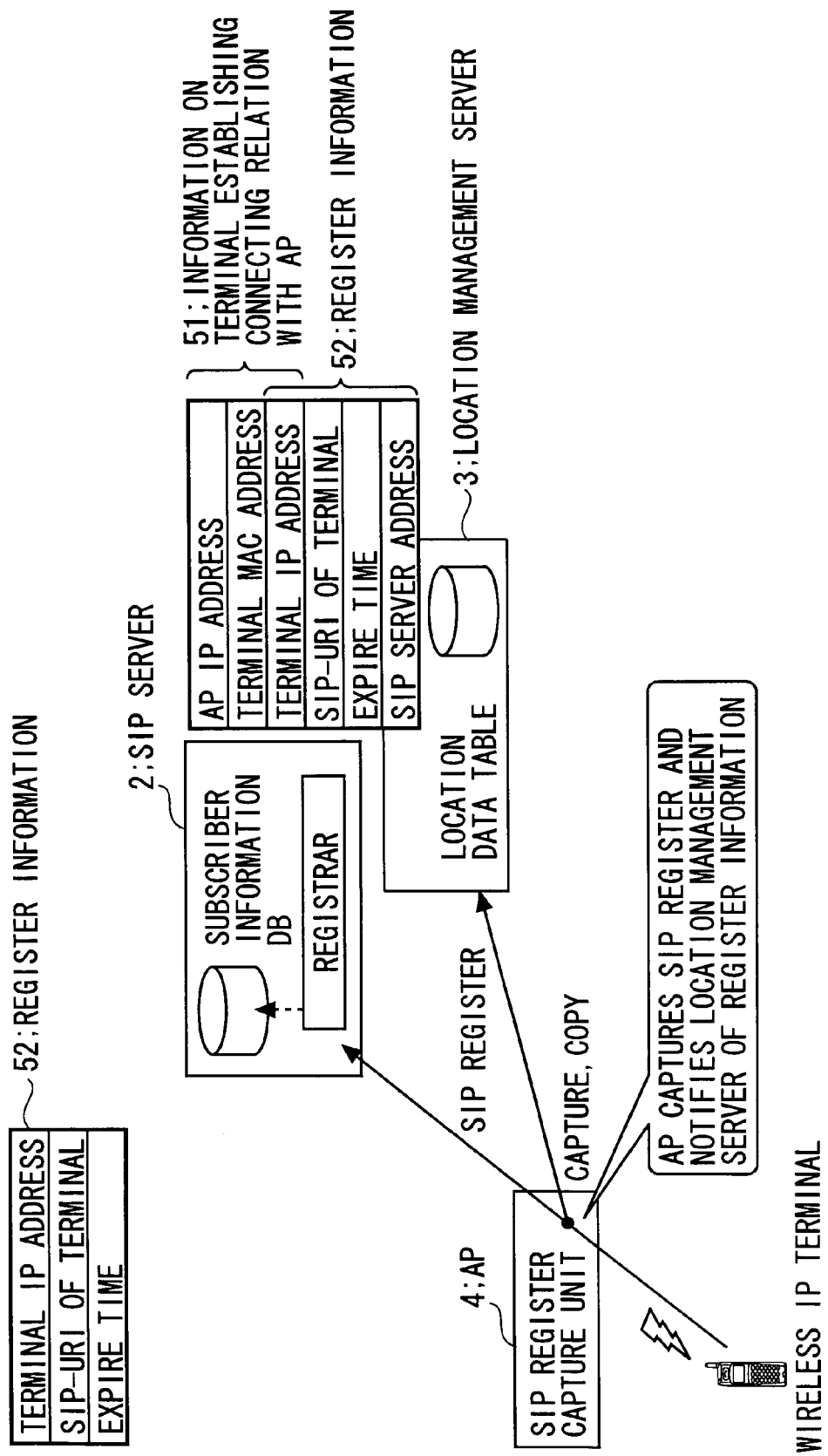
FIG. 8 is an explanatory diagram related to the notification of the location information.

Next, FIG. 7 shows a sequence in which the access point 4 starts with capturing an SIP Register (location registration request) of the terminal 1 and ends with giving a notification to the location management server 3. Further, FIG. 8 illustrates an outline of the operation at that time.

The terminal 1, when connecting to the network N (the access point 4), sends an SIP Register message defined as a location registration request to the SIP server 2 (S11).

In the access point 4, when the packet identifying unit 45 judges the message to be an SIP Register message (S12), a Register capture unit 47 captures and analyzes the SIP Register message (S13).

In the access point 4, the communication control unit 44 processes a packet defined as the SIP register message as usual and forwards the packet to the destination (S14), and the location notifying unit 41 notifies the location management server 3 of the IP address of the terminal 1, an SIP-URI (Uniform Resource Identifier) of the terminal 1, a valid period (Expire Time) and an address of the SIP server 2 as pieces of Register information 52 (S15).

In the location management server 3, the message receiving unit 33 receives the connecting information 51 from the access point 4 in step 10, and the location management unit 32 registers the connecting information 51 in the location data table 35. Further, in the case of receiving the Register information 52 in step 15, the location management unit 32 registers the Register information in the location data table 35 in a way that associates the Register information 52 with the connecting information 51 containing the IP address coincident with the IP address of the terminal 1. Note that the location management unit 32 monitors the valid period (Expire Time) of the Register information 52 and, when reaching the valid period, deletes the location information from the location data table 35.

Further, in the SIP server 2, the Register processing unit 23 registers the Register information in the subscriber DB 25 on the basis of the SIP Register message received from the access point 4 in step 14. It is to be noted that the Register processing unit 23 monitors the valid period of the Register information and, when the valid period expires, deletes the Register information from the subscriber DB 25.

On the other hand, the terminal 1, before the registered Register information expires, periodically sends the SIP Register message to the SIP server 2.

Figure 9:
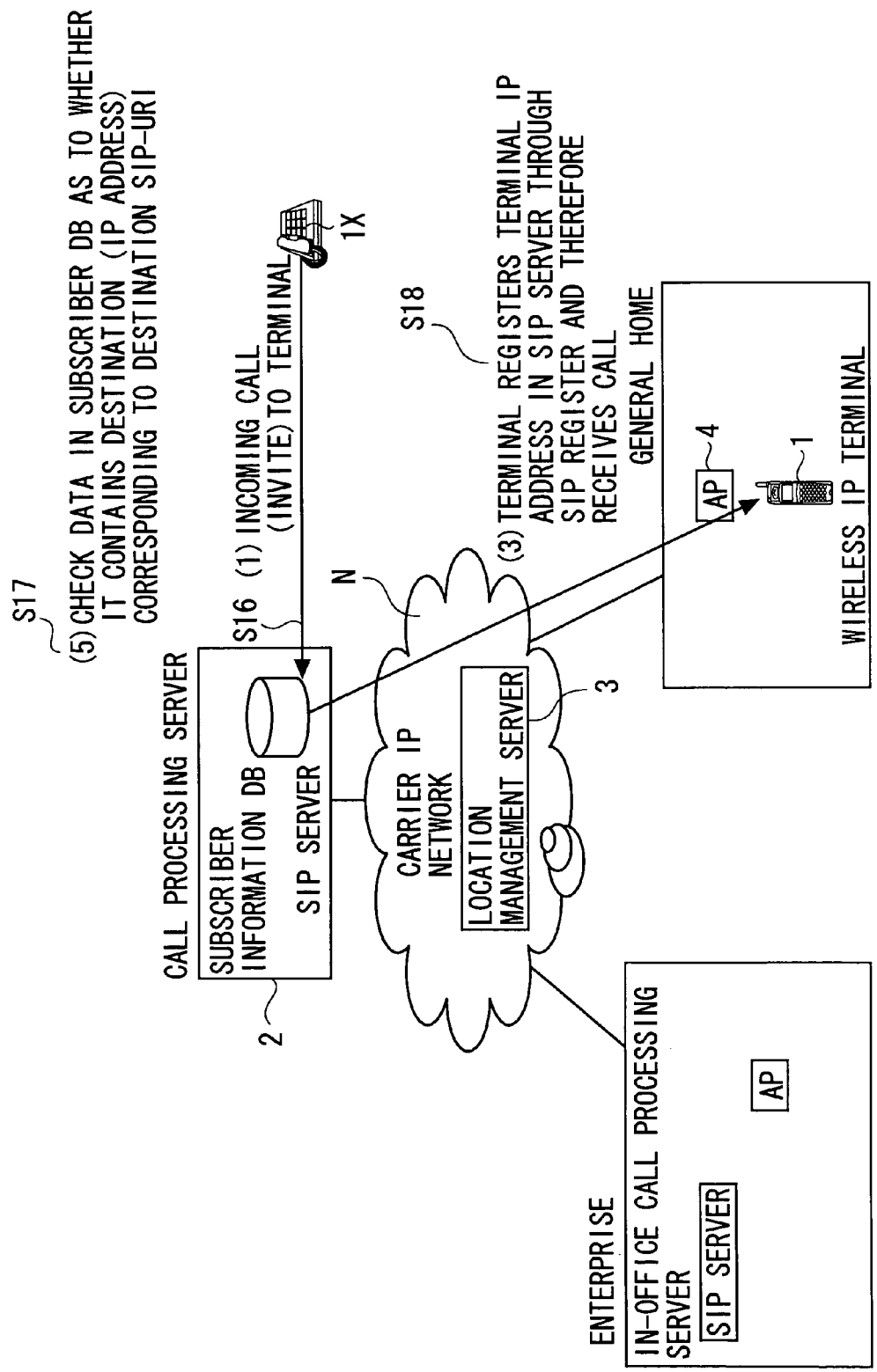
FIG. 9 is an explanatory diagram of an incoming call in a case where the terminal exists in a wireless area of an access point of a home.

A user of a terminal 1x designates and dials a phone number of the terminal 1 serving as a phone callee, at which time, as shown in FIG. 9, the terminal 1x transmits an originating call addressed to the SIP-URI corresponding to this phone number to the SIP server 2 (S16).

The SIP server 2 receiving the destination SIP-URI searches the subscriber DB and thus checks whether the corresponding SIP-URI is registered or not (S17). Then, if registered, the call to the terminal 1 having the SIP-URI from the terminal 1x is set up (S18).

Thus, the call setting is done based on the information registered by the terminal 1 through the SIP Register message in the SIP server 2, and hence the terminal 1 can call other terminals even when moving everywhere if within the wireless area of the access points 4.

On the other hand, when the terminal 1 moves outside the wireless area of the access point 4, the call setting can not be done based on the information registered in the SIP server 2, and therefore the access point 4 invalidates the information registered in the SIP server 2.

Figure 10:
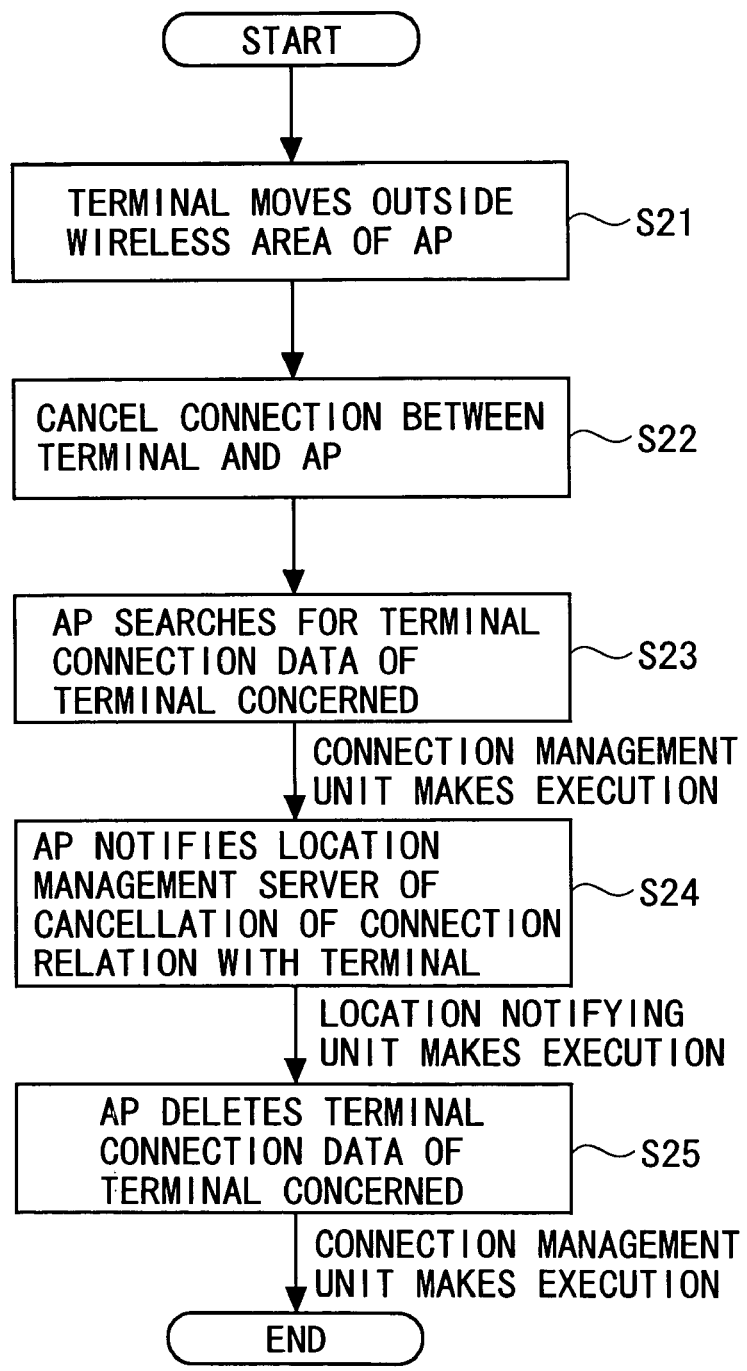
FIG. 10 is a flowchart showing a sequence when canceling the connection of the terminal.
Figure 11:
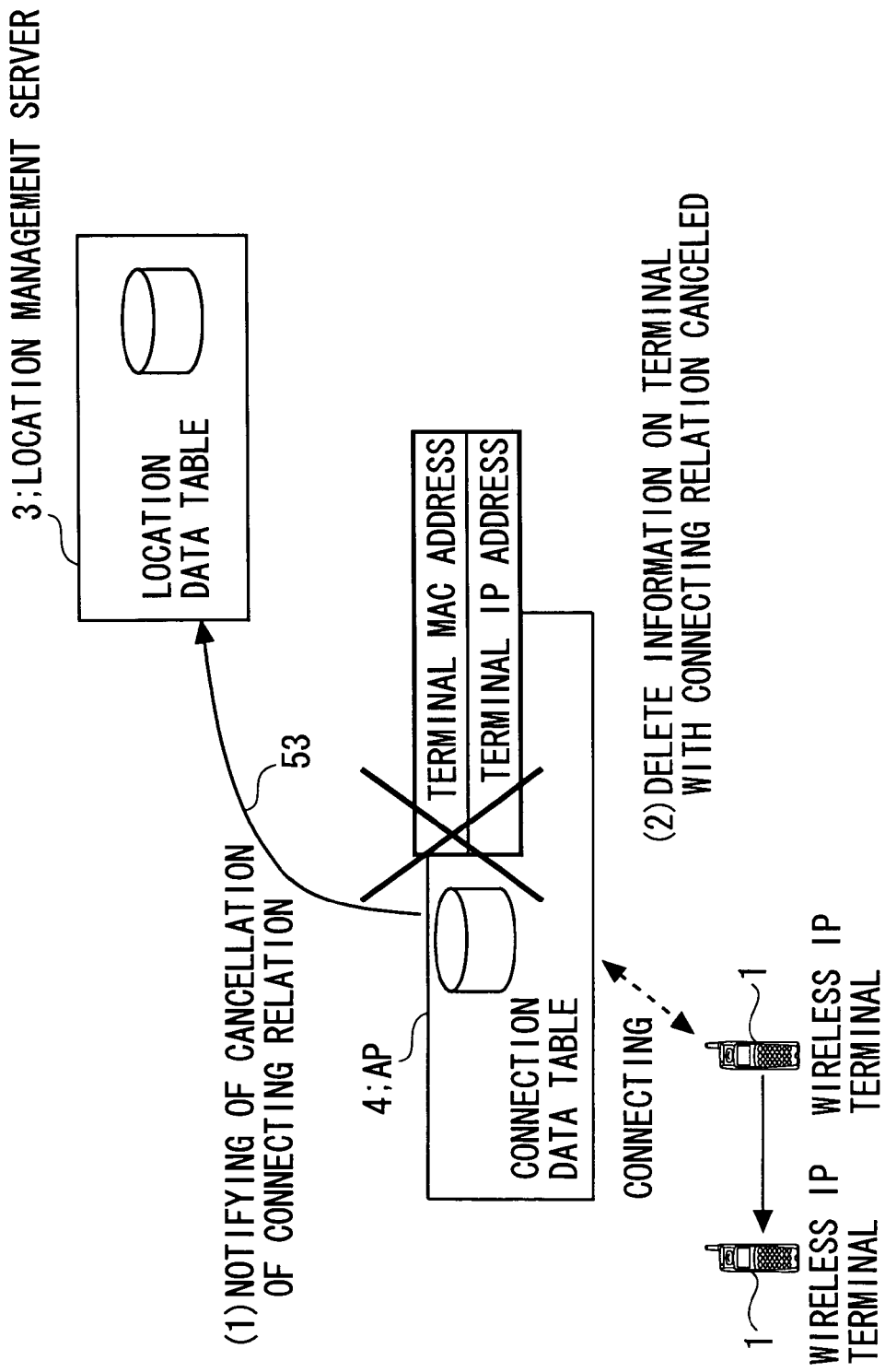
FIG. 11 is an explanatory diagram when canceling a connecting relation.

FIG. 10 shows a sequence when the connecting relation between the access point 4 and the terminal 1 is canceled. FIG. 11 shows an outline of the operation at that time.

The terminal 1 moves outside the wireless area (S21), and, when the transmission from the terminal 1 discontinues for a predetermined period of time, the connection management unit 42 of the access point 4 cancels the connecting relation with the terminal 1 (S22).

Then, the connection management unit 42 searches the connection data table 48 for the MAC address and the IP address of the terminal 1 (S23).

The location notifying unit 41 sends, as a connecting status (disconnecting notification) 53 of the terminal 1, the MAC address and the IP address of the terminal 1 and the information representing the cancellation of the connecting relation to the location management server 3 (S24).

Further, the connection management unit 42 deletes the connecting information of the terminal 1 from the connection data table 48 (S25).

Figure 12:
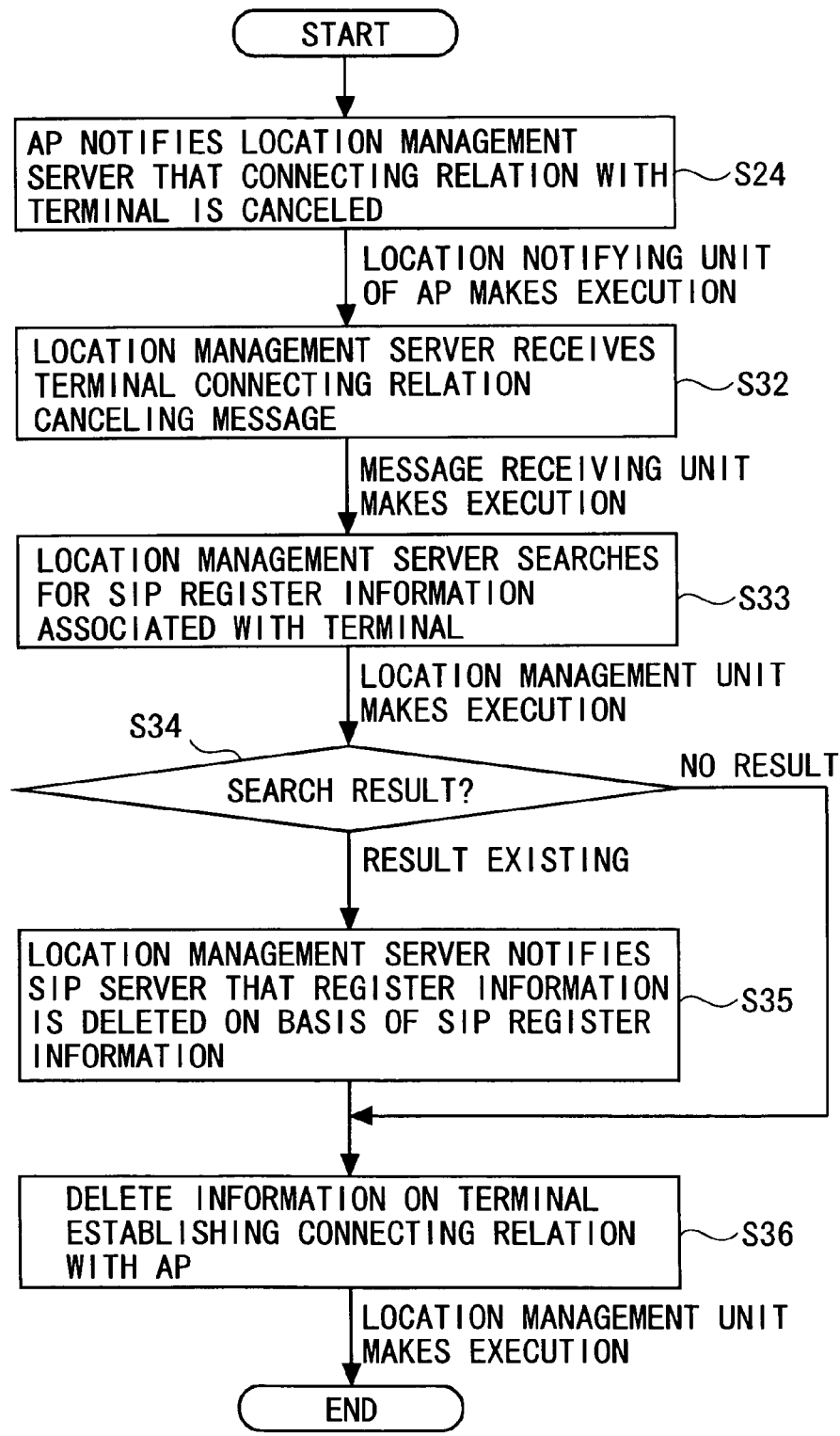
FIG. 12 is a flowchart showing a sequence when canceling the connecting relation.
Figure 13:
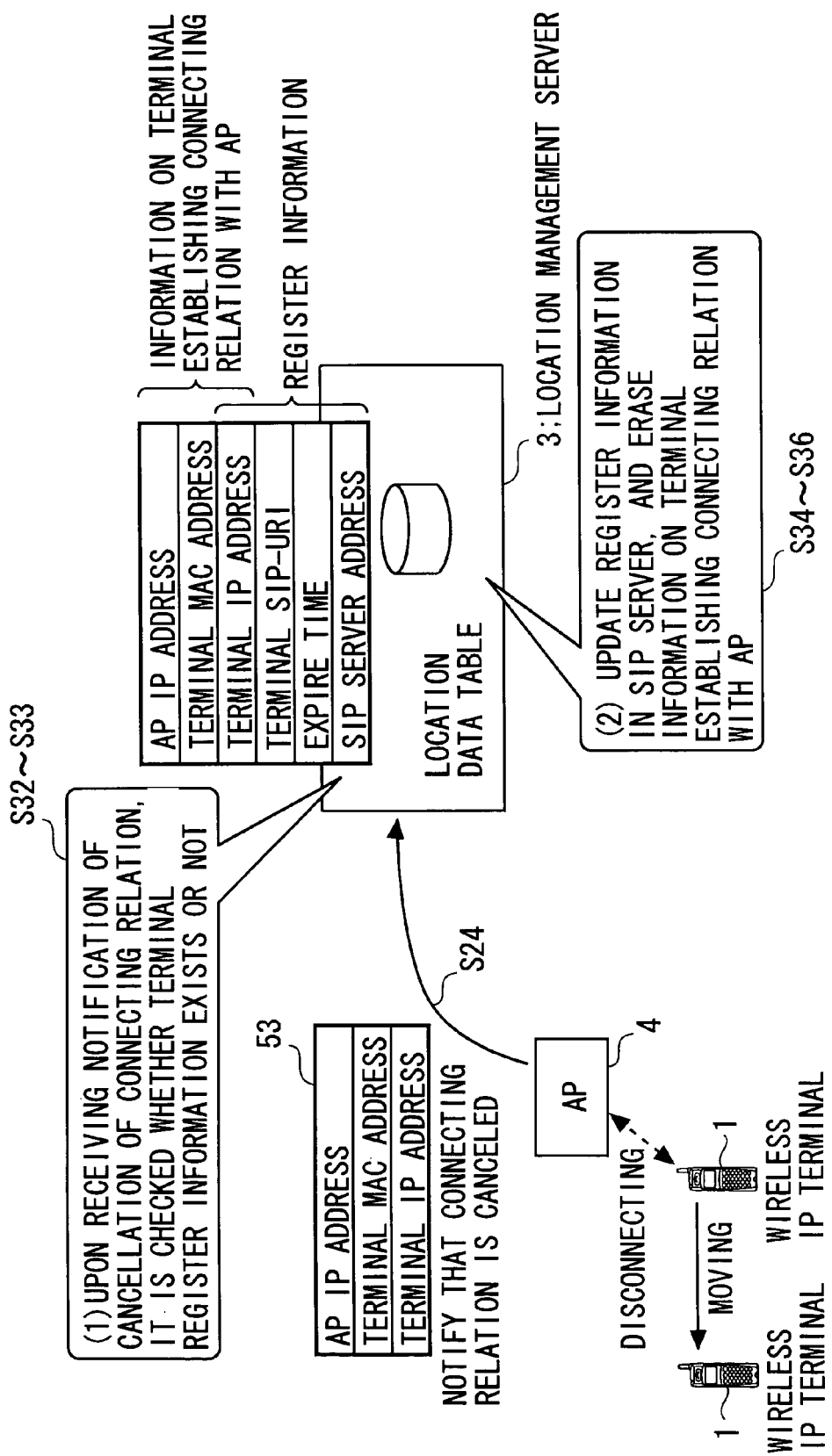
FIG. 13 is an explanatory diagram when canceling the connecting relation.
Figure 14:
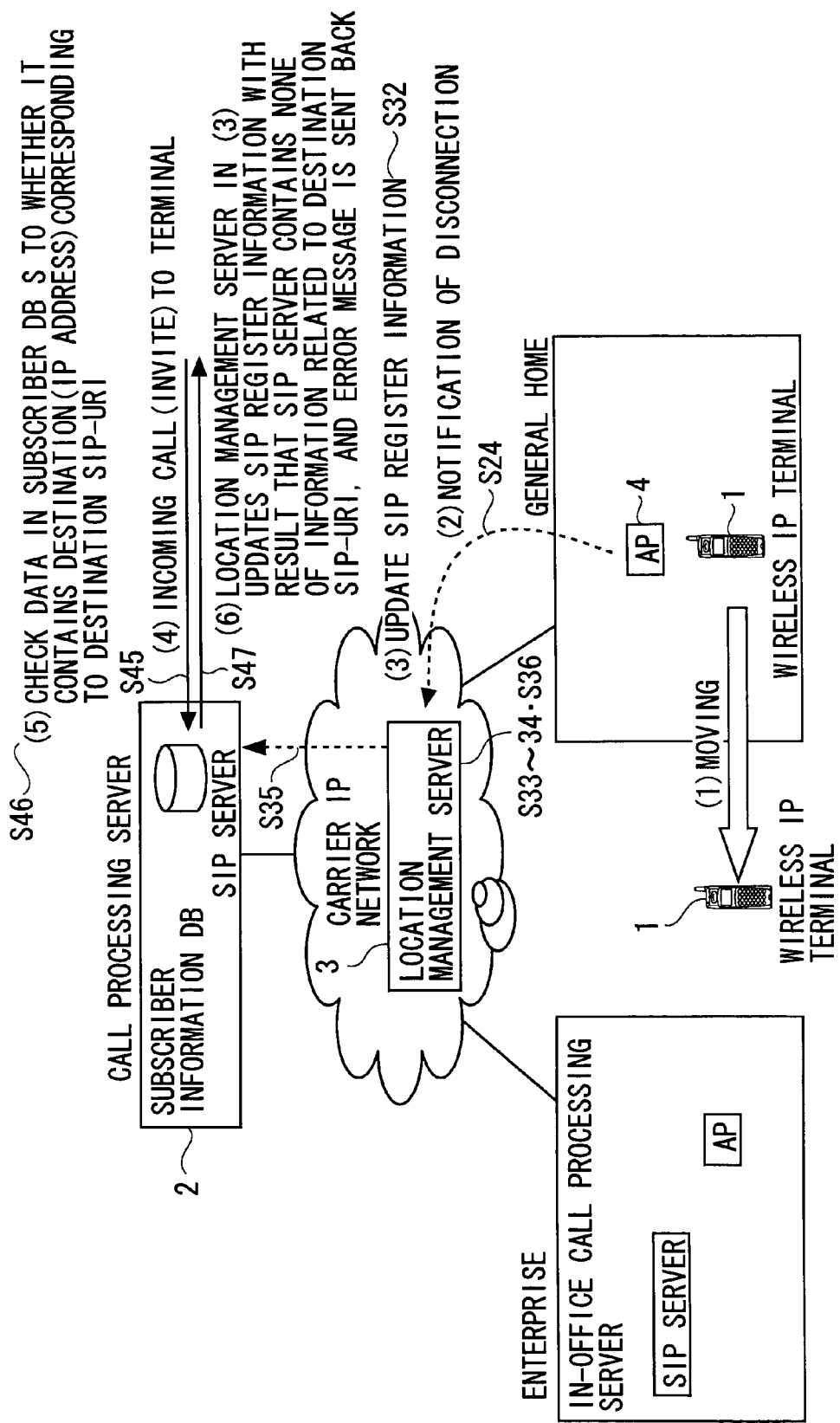
FIG. 14 is an explanatory diagram in a case where the terminal moves outside the wireless area of the access point of the home.

When the access point 4 sends the disconnection notification 53 in step 24, in the location management server 3, as shown in FIGS. 12 through 14, the message receiving unit 33 receives the disconnecting notification 53 (S32), and the location management unit 32 searches the location data table 35 and thus checks whether or not there is the Register information associated with the location information of the terminal 1 (S33).

When having searched for the Register information of the terminal 1, the SIP server communication unit 31 notifies the SIP server 2 of an update of the Register information (S34-S35).

Then, the location management unit 32 deletes the connecting information of the terminal 1 from the location data table 35 (S36).

Figure 15:
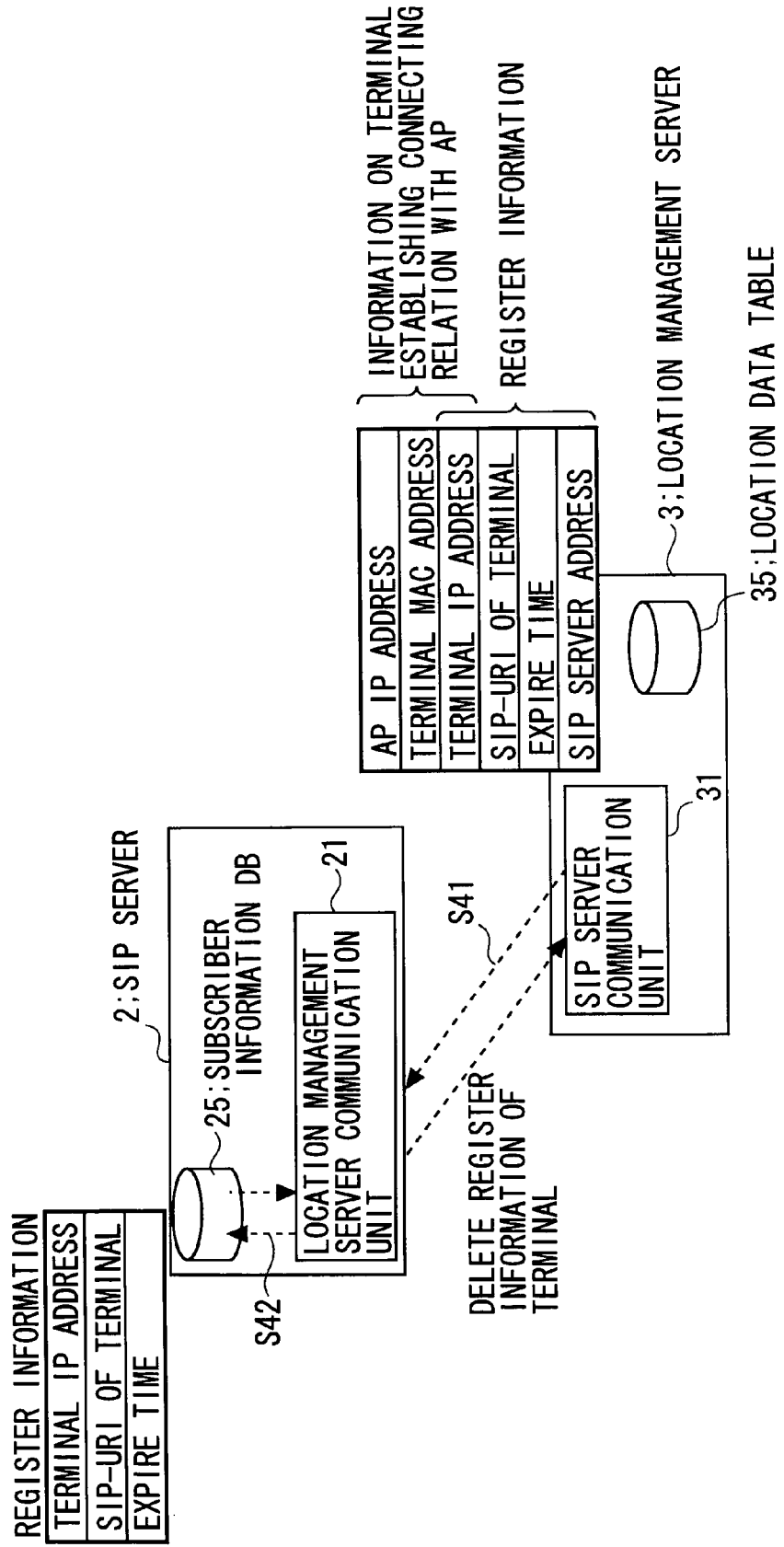
FIG. 15 is an explanatory diagram of updating Register information.

Furthermore, in step 35, when notifying of the update of the Register information, in the location management server 3, for example, as shown in FIG. 15, the SIP server communication unit 31 of the location management server 3 notifies the location server communication unit 21 of the SIP server 2 of a delete request together with the SIP-URI of the terminal 1 (S41).

In the SIP server 2 receiving the delete notification, the Register processing unit 23 deletes the Register information containing the coincident SIP-URI (S42).

Figure 16:
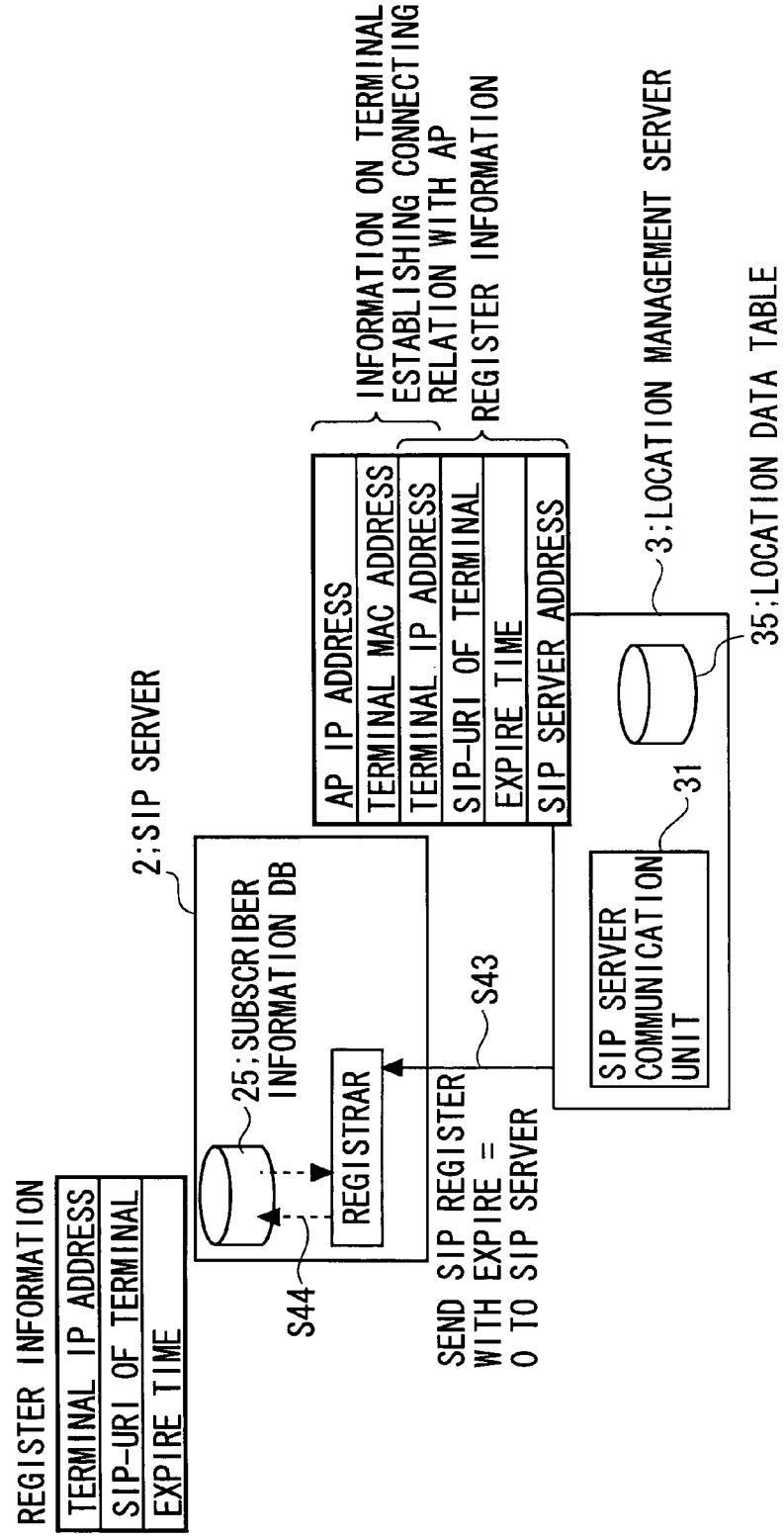
FIG. 16 is an explanatory diagram of updating the Register information.

Note that without being limited to this procedure in FIG. 15, for instance, as shown in FIG. 16, the location management server 3 may send the SIP Register to the SIP server 2 on the basis of the Register information of the terminal 1 (S43). At this time, if the valid period of the SIP Register is set to "0", the SIP server 2 receiving the SIP Register immediately judges that the Register information expires, and therefore deletes the Register information (S44).

Thus, the access point 4, as triggered by the cancellation of the connection with the terminal 1, notifies the SIP server 2 of the invalidity of the Register information of the terminal 1, whereby the subscriber DB 25 of the SIP server 2 is properly updated without waiting for the expiration of the Register information.

Accordingly, as shown in FIG. 14, even when an incoming call is given to the terminal 1 just after the terminal 1 has moved outside the wireless area of the access point 4 (S45), the subscriber DB 25 of the SIP server 2 has already been updated by the location management server 3, and hence it is confirmed that the subscriber DB 25 does not contain the SIP-URI of the terminal 1 (S46), whereby an error message can be properly sent back (S47).

Figure 17:
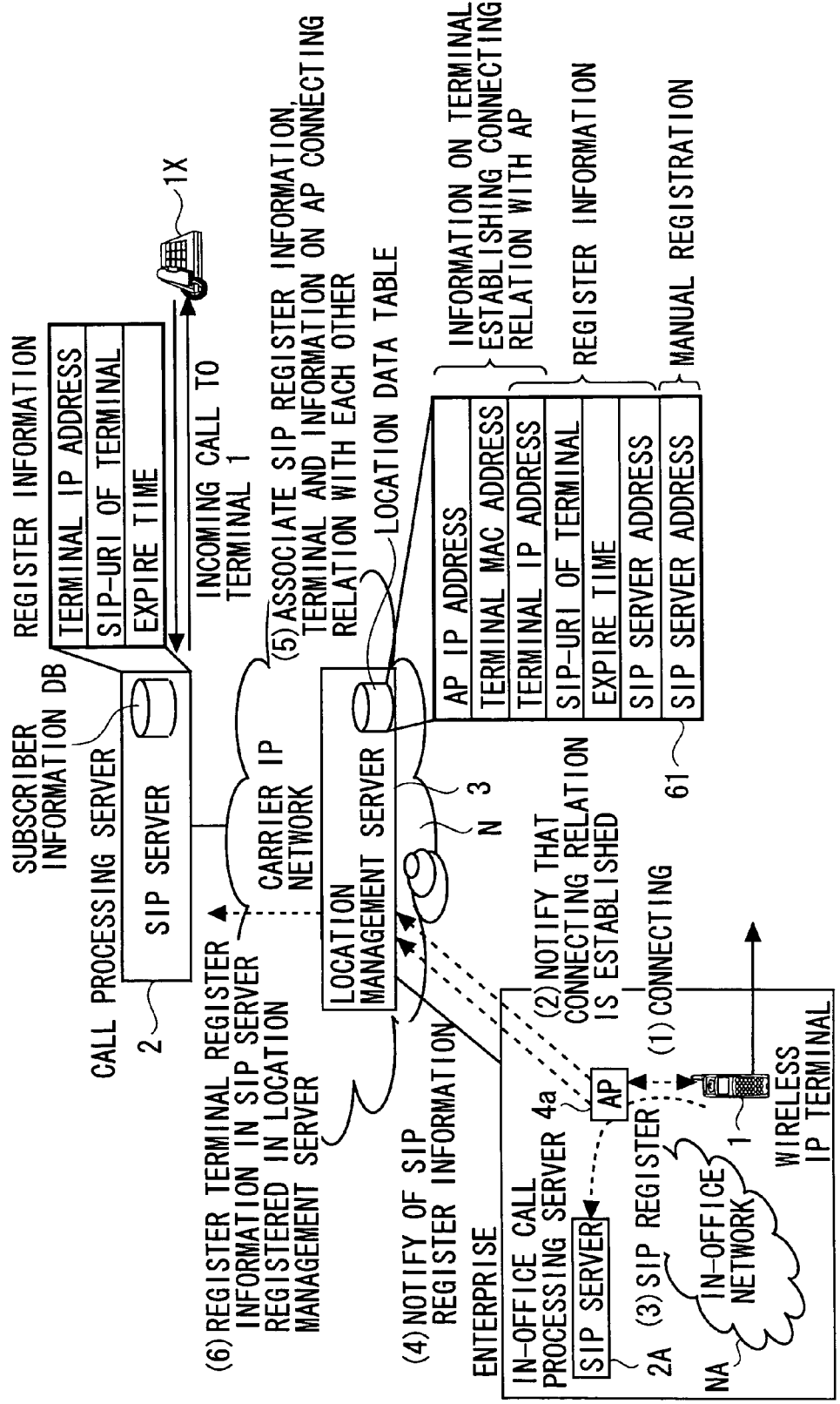
FIG. 17 is an explanatory diagram of updating the Register information.

FIG. 17 is an explanatory diagram in such a case that the user moves within an enterprise and the terminal 1 is connected to an in-office network NA. Herein, an access point 4A is a wireless LAN access point via which a connection to the in-office network is established, and has the same functions as the access point 4 described above has. Further, a SIP server 2A is a device for controlling the call between in-office IP terminals, and has the same functions as those of the SIP server 2 described above. Therefore, the access point 4A and the SIP server 2A perform the operations corresponding to the respective steps, of the access point 4 and the SIP server 2, shown in FIGS. 5 and 7, in which case the numbers of the steps are described.

When the terminal 1 enters a wireless area covered by the access point 4A, the terminal 1 searches for the access point 4A (S1) and issues an association request to the access point 4A in order to establish the connecting relation (S2).

In response to this association request, the access point 4A requests the terminal 1 for authentication information such as an ID and an authentication key (S3). When receiving the authentication information from the terminal 1, the access point 4A authenticates the terminal 1 on the basis of the authentication information (S4-S5).

Upon a pass of the authentication of the terminal 1, the access point 4A establishes the connecting relation with the terminal 1 (S6). At this time, the connection management unit 42 registers MAC address information of the connected terminal 1 in the connection data table 48 (S7).

The terminal 1, upon connecting to the access point 4A, acquires an IP address by use of DHCP (Dynamic Host Configuration Protocol), thereby entering an IP-communications-enabled status (S8).

Then, the access point 4A associates the IP address acquired by the terminal 1, i.e., the location information of the terminal 1 on the network with the MAC address (address mapping), and the connection management unit 42 registers this address mapping in the connection data table 48 (S9). Based on the information in this connection data table 48, the access point 4A relays the communications related to the terminal 1.

After registering the MAC address and the IP address, the location notifying unit 41 of the access point 4A associates the MAC address, the terminal IP address and an IP address of the access point 4A with each other, and notifies the location management server 3 of this address mapping as the connecting information 51 with the terminal 1, and notifies the location management server 3 of this connecting information 51 (S10).

On such an occasion that this terminal 1 connects to the access points 4, 4A, network identifying information such as SSID (Service Set Identifier) and ESSID (Extended SSID) is acquired by the search in step 1, and the terminal ID and the authentication key are transmitted with a preset content (environment setting) corresponding to the identifying information.

Further, the terminal 1 makes the location registration request on the basis of the environment setting (S11). For example, the terminal 1 sends the SIP Register to the SIP server 2 when connecting to the access point 4 (i.e., the network N), and sends the SIP Register to the SIP server 2A when connecting to the access point 4A (i.e., the network NA).

In the access point 4A, when the packet identifying unit 45 judges the packet from the terminal 1 to be this Register message (S12), the Register capture unit 47 captures and analyzes the SIP Register 52 (S13).

In the access point 4A, the communication control unit 44 processes the packet defined as the SIP register message as usual and forwards the packet to the destination (the SIP server 2A) (S14), and the location notifying unit 41 notifies the location management server 3 of the IP address of the terminal 1, the SIP-URI (Uniform Resource Identifier) of the terminal 1, the valid period (Expire Time) and an address of the SIP server 2A as pieces of Register information 52 (S15).

In the location management server 3, the message receiving unit 33 receives the connecting information 51 from the access point 4A in step 10, and the location management unit 32 registers the connecting information 51 in the location data table 35.

Further, in the case of receiving the Register information 52 in step 15, the location management unit 32 registers the Register information in the location data table 35 in a way that associates the Register information with the connecting information containing the IP address coincident with the IP address of the terminal 1. Then, the SIP server communication unit 31 sends the SIP Register message to a predetermined address, i.e., an address 61 of the SIP server 2 in the first embodiment on the basis of this Register information. In the first embodiment, the predetermined address (the address 61 of the SIP server 2) is previously stored in the storage unit (the location data table) in a way that associates this address with the MAC address etc of the terminal. Herein, the location management server 3, if the SIP server address in the Register information received from the access points 4, 4A is an address other than the predetermined address, sends the location registration request of the terminal 1, i.e., the SIP Register message to this predetermined address. It should be noted that in the first embodiment, the address of the SIP server 2 is registered beforehand in the location management server 3, however, the invention may, without being limited to this scheme, take such a scheme that when the terminal 1 sends the SIP Register to the in-office SIP server 2A, the address 61 of the SIP server 2 is added (entered) in an option field etc of the header, and the access point 4 (4A) or the location management server 3 makes the location registration request as targeted at this address 61.

Further, the location management unit 32 of the location management server 3 monitors the valid period of the Register information and, when reaching the valid period, deletes the location information from the location data table 35.

On the other hand, in the SIP server 2A, the Register processing unit 23 registers the Register information in the subscriber DB 25 on the basis of the SIP Register message received from the access point 4 in step 14. Note that the Register processing unit 23 monitors the valid period of the SIP Register and, when the valid period expires, deletes the SIP Register from the subscriber DB.

Moreover, the terminal 1, before the registered Register information expires, periodically sends the SIP Register message to the SIP server 2. Accordingly, the SIP Register message is, as described above, periodically sent to the SIP server 2.

When the terminal 1x requests the SIP server 2 for an incoming call addressed to the SIP-URI specifying the terminal 1 (S16), however, the SIP server 2 searches through the subscriber DB and thus checks whether the SIP-URI corresponding thereto is registered or not (S17). Then, if registered, the call between the terminal 1 specified by the SIP-URI and the terminal 1x is set up (S18).

Thus, even in such a situation that the terminal 1 making the location registration in the network N moves to another network NA and makes the location registration in another SIP server 2A, the access point 4A makes the location registration in the SIP server 2 via the location management server 3, and the subscriber DB of the SIP server 2 is updated. This enables the SIP server 2 to set up the call between the terminal 1 and the terminal 1x on the basis of the location information in the subscriber DB.

On the other hand, when the terminal 1 moves outside the wireless area of the access point 4A, it is impossible to set up the call on the basis of the information registered in the SIP servers 2, 2A, and hence the information registered in the SIP servers 2, 2A is invalidated.

Figure 18:
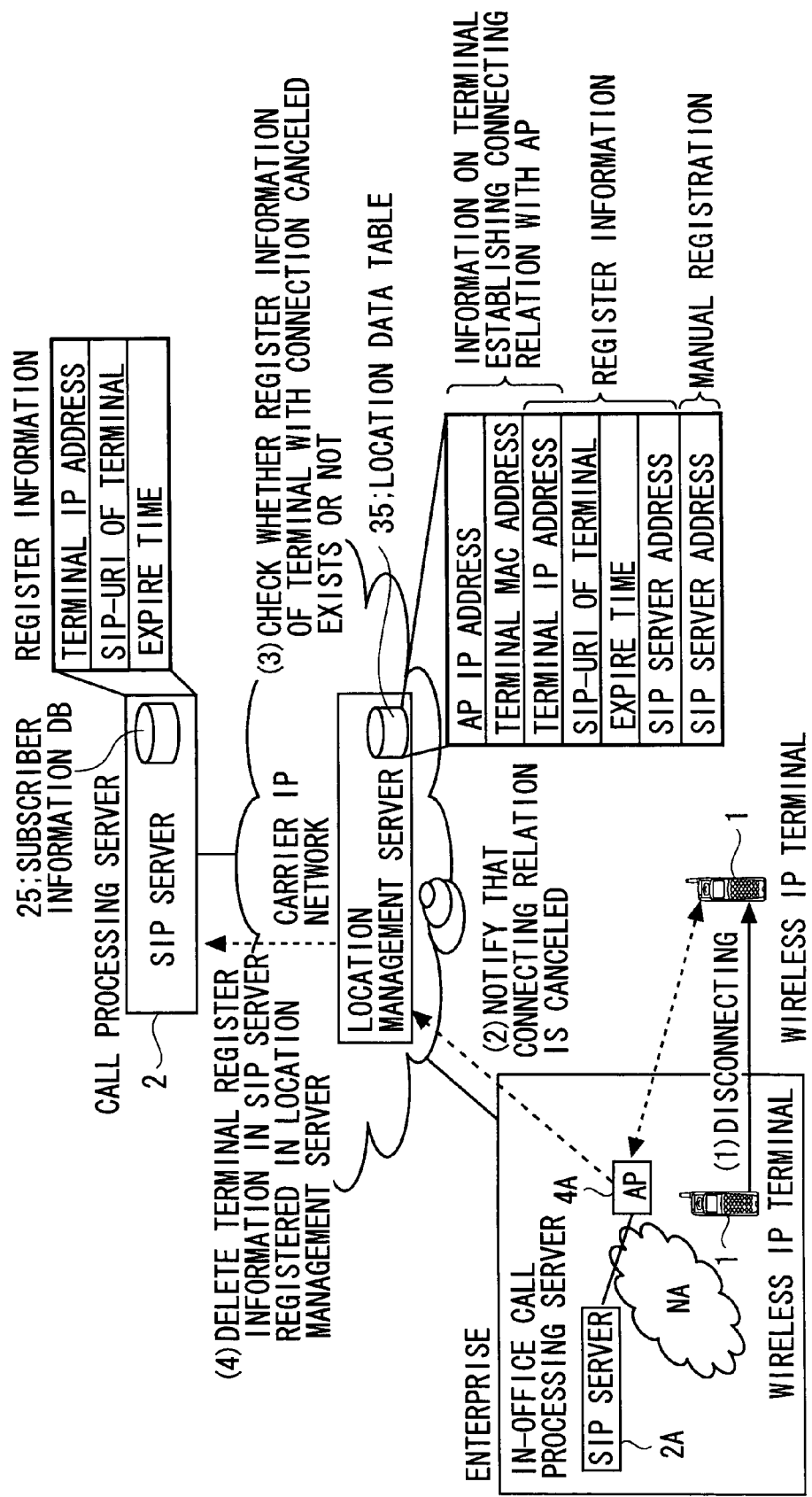
FIG. 18 is an explanatory diagram of updating the Register information.

FIG. 18 shows an outline of the operation when the connecting relation between the access point 4A and the terminal 1 is canceled.

The terminal 1 moves outside the wireless area (S21), and, when the transmission from the terminal 1 discontinues for a predetermined period of time, the connection management unit 42 of the access point 4A cancels the connecting relation with the terminal 1 (S22).

Then, the connection management unit 42 searches the connection data table 48 for the MAC address and the IP address of the terminal 1 (S23).

The location notifying unit 41 sends, as the connecting status (disconnecting notification) 53 of the terminal 1, the MAC address and the IP address of the terminal 1 and the information representing the cancellation of the connecting relation to the location management server 3 (S24).

Moreover, the connection management unit 42 deletes the connecting information of the terminal 1 from the connection data table 48 (S25).

When the access point 4A sends the disconnection notification 53 in step 24, in the location management server 3, as shown in FIGS. 12 through 14, the message receiving unit 33 receives the disconnecting notification 53 (S32), and the location management unit 32 searches the location data table 35 and thus checks whether or not there is the Register information associated with the location information of the terminal 1 (S33).

When having searched for the Register information of the terminal 1, the SIP server communication unit 31 notifies the SIP servers 2, 2A of an update of the Register information (S34-S35).

Then, the location management unit 32 deletes the connecting information of the terminal 1 from the location data table 35 (S36).

Note that in step 35, when notifying of the update of the Register information, in the location management server 3, for example, as shown in FIG. 15, the SIP server communication unit 31 of the location management server 3 notifies the location server communication unit 21 of each of the SIP servers 2, 2A of a delete request together with the SIP-URI of the terminal 1 (S41).

In the SIP server 2 receiving the delete notification, the Register processing unit 23 deletes the Register information containing the coincident SIP-URI (S42).

Furthermore, without being limited to this procedure in FIG. 15, for instance, as shown in FIG. 16, the location management server 3 may send the SIP Register message to the SIP servers 2, 2A on the basis of the Register information of the terminal 1 (S43). At this time, if the valid period of the SIP Register message is set to "0", the SIP servers 2, 2A receiving the SIP Register message immediately judge that the Register information expires, and therefore delete the Register information (S44).

Thus, the access point 4A, as triggered by the cancellation of the connection with the terminal 1, notifies the SIP servers 2, 2A of the invalidity of the Register information of the terminal 1, whereby the subscriber DB 25 of each of the SIP servers 2, 2A is properly updated without waiting for the expiration of the Register information.

Figure 19:
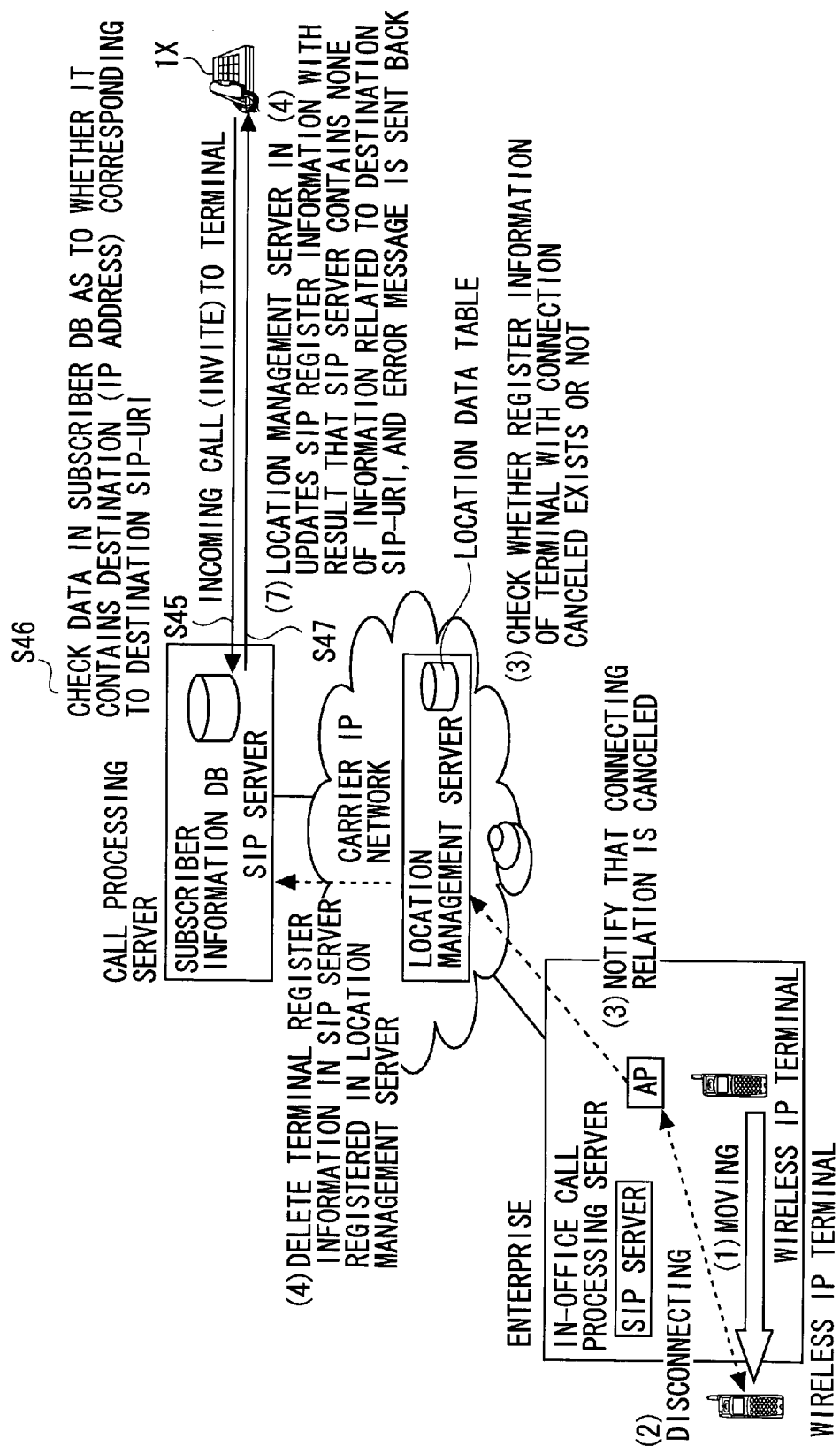
FIG. 19 is an explanatory diagram in a case where the terminal moves outside the wireless area of an in-office access point.

Accordingly, as shown in FIG. 19, even when an incoming call is given to the terminal 1 just after the terminal 1 has moved outside the wireless area of the access point 4A (S45), the subscriber DB of the SIP server 2 has already been updated by the location management server 3, and hence it is confirmed that the subscriber DB does not contain the SIP-URI of the terminal 1 (S46), whereby an error message can be properly sent back (S47).

Note that the location management server 3 may not necessarily send the delete notification to all the SIP servers having the location data tables stored with the Register information. For example, an available scheme is that the location management server 3 sends the delete notification to only the SIP server 2, and the SIP server 2A deletes the Register information when the valid period expires.

As explained above, according to the embodiment, the access point (the relay device) causes the registration information (the location information, i.e., the SIP Register) of the SIP server 2 to be updated through the location management server 3 in accordance with the connecting status of the terminal, and hence the Register information of the SIP server (the call control device) is updated along with the movement of the terminal, thereby decreasing the period for which the location information of the terminal registered in the SIP server remains not to be coincident with the present location of the terminal. Accordingly, in spite of the terminal's residing in a radio-wave-unreachable area, it is possible to restrain futile consumption of the network resources such as trying to originate the call to the terminal and restrain the execution of such a process that the call reaches a location different from the actual terminal location.

Further, the non-coincident with the location information can be reduced without shortening the Register update period of the terminal, whereby a load applied on the SIP server can be reduced and the power consumption of the terminal can be restrained because of the terminal's having no necessity of frequently making the location registration through register. It is important especially for the mobile IP phone terminal to save the electric power of the terminal, and the embodiment is useful for saving the electric power of the mobile terminal.

Others

The invention is not limited to only the illustrated examples given above and can be, as a matter of course, changed in a variety of forms in the range that does not deviate from the gist of the invention. For example, the embodiment discussed above has exemplified the example of employing the wireless LAN access point as the relay device, however, the invention is not limited to this configuration, and the relay device may be a device that relays the communications of the terminals and may also be a router and wireless LAN switch.

INCORPORATION BY REFERENCE

The disclosures of Japanese patent application No. JP2006-023383 filed on Jan. 31, 2006 including the specification, drawings and abstract are incorporated herein by reference.

What is claimed is:

1. A call system comprising:
a call control device to perform call control between terminals on the basis of location information of the terminals;
a relay node to relay communications of the terminals; and
a location management device to manage the location information of the terminals,
the relay node including:
a request detecting unit to detect a location registration request given to the call control device from a terminal;
a notifying unit to notify the call control device of the detected location registration request and to notify the location management device of a registration information of the terminal, the registration information including an address of the call control device which is an original destination of the detected location registration request; and
a connection detecting unit to detect a connecting status with the terminal,
wherein the notifying unit notifies, if the connecting status with the terminal is changed, the call control device of an update of the location information, and
the location management device including:
an update notifying unit to send a location registration request to a predetermined address, and
a location management unit to judge based on the connecting status of the terminal whether a connecting location of the terminal moves or not,
wherein when the terminal moves, the update notifying unit notifies the call control device of an update of the location information, and the notifying unit of the relay node notifies the location management device of the connecting status with the terminal, and the update notifying unit of the location management device is thereby made to notify the call control device of the update of the location information.

2. The call system according to claim 1, wherein if the receiving unit of the location management device receives cancellation of the connection of the terminal, the update notifying unit notifies the call control device of invalidity of the location information registered by the terminal.

3. The call system according to claim 1, wherein the location management device manages registration information representing whether the location information of the terminal is registered in the call control device or not and information about the connecting status of the terminal in a way that associates these items of information with each other, and the update notifying unit, if the connection with the terminal making a location registration request is canceled, notifies of this cancellation.

4. The call system according to claim 1, wherein when the location management device receives, from the relay node, the notification purporting that the connection to the terminal is established, the update notifying unit notifies the call control device of the update of the location information.

5. A relay node to relay communications of a terminal subjected to call control by a call control device on the basis of location information of terminals managed by a location management device, comprising:
a request detecting unit to detect a location registration request given to the call control device from a terminal;
a notifying unit to notify the call control device of the detected location registration request and to notify the location management device of a registration information of the terminal including an address of the call control device which is an original destination of the detected location registration request; and
a connection detecting unit to detect a connecting status with the terminal, wherein the notifying unit notifies, if the connecting status with the terminal is changed, the call control device of an update of the location information,
wherein if the connection with the terminal making the location registration request is canceled, the notifying unit notifies of this cancellation.

6. A communication method executed by a relay node to relay communications of a terminal subjected to call control by a call control device on the basis of location information of the terminals managed by a location management device, comprising:
detecting a location registration request given to the call control device from a terminal;
notifying the call control device of the detected location registration request; and
notifying the location management device of a registration information of the terminal including an address of the call control device which is an original destination of the detected location registration request;
detecting a connecting status with the terminal; and
notifying, if the connecting status with the terminal is changed, the call control device of an update of the location information,
wherein when the connection with the terminal making the location registration request is canceled, a notification of the location information is given.

7. A non-transitory recording medium recorded with a communication program executed by a relay node to relay communications of a terminal subjected to call control by a call control device on the basis of location information of the terminals managed by a location management device, comprising:
detecting a location registration request given to the call control device from a terminal;

notifying the call control device of the detected location registration request;

notifying the location management device of a registration information of the terminal including an address of the call control device which is an original destination of the detected location registration request;

detecting a connecting status with the terminal; and notifying, if the connecting status with the terminal is changed, the call control device of an update of the location information, wherein when detecting the location registration request given to the call control device from the terminal and when the connection with the terminal making the location registration request is canceled, a notification of the location information is given.

8. A call system comprising:

a call control device to perform call control between terminals on the basis of location information of the terminals;

a relay node to relay communications of the terminals; and a location management device to manage the location information of the terminals and connected to a network, the relay node including:

a request detecting unit to detect a location registration request given to the call control device from a terminal; and a notifying unit to notify the call control device of the detected location registration request and to notify the location management device connected to the network which is different from a network the call control device and the relay node connect of a registration information of the terminal, the registration information including an address of the call control device which is an original destination of the detected location registration request; and the location management device including:

an update notifying unit to send a location registration request to a predetermined address.

9. The call system according to claim 8, wherein the relay node further includes a connection detecting unit to detect a connecting status with the terminal, and wherein the notifying unit notifies, if the connecting status with the terminal is changed, the call control device of an update of the location information.

10. A relay node to relay communications of a terminal subjected to call control by a call control device on the basis of location information of terminals managed by a location management device connected to a network, comprising:

a request detecting unit to detect a location registration request given to the call control device from a terminal; and a notifying unit to notify the call control device of the detected location registration request and to notify the location management device connected to the network which is different from a network the call control device and the relay node connect of a registration information of the terminal including an address of the call control device which is an original destination of the detected location registration request.

11. The relay node according to claim 10, further comprising a connection detecting unit to detect a connecting status with the terminal, wherein the notifying unit notifies, if the connecting status with the terminal is changed, the call control device of an update of the location information.

12. The relay node according to claim 11, wherein the notifying unit notifies a location management device managing the location information of the terminals, of the connecting status with the terminal, and the location management device is thereby made to notify the call control device of the update of the location information.

13. The relay node according to claim 11, wherein if cancellation of the connection with the terminal is detected, the notifying unit notifies the call control device of invalidity of the location information registered by the terminal.

14. The relay node according to claim 11, wherein when connecting to the terminal, the notifying unit notifies the call control device of an update of the location information.

15. A communication method executed by a relay node to relay communications of a terminal subjected to call control by a call control device on the basis of location information of the terminals managed by a location management device connected to a network, comprising:

detecting a location registration request given to the call control device from a terminal;

notifying the call control device of the detected location registration request; and notifying the location management device connected to the network which is different from a network the call control device and the relay node connect of a registration information of the terminal including an address of the call control device which is an original destination of the detected location registration request.

16. The communication method according to claim 15, further comprising:

detecting a connecting status with the terminal; and notifying, if the connecting status with the terminal is changed, the call control device of an update of the location information.

17. The communication method according to claim 16, wherein on the occasion of notifying, a location management device managing the location information of the terminals is notified of the connecting status with the terminal, and the location management device is thereby made to notify the call control device of the update of the location information.

18. The communication method according to claim 16, wherein if cancellation of the connection with the terminal is detected, the call control device is notified of invalidity of the location information registered by the terminal by way of a notification of the update.

19. The communication method according to claim 16, wherein when connecting to the terminal, the call control device is notified of an update of the location information.

20. A non-transitory recording medium recorded with a communication program executed by a relay node to relay communications of a terminal subjected to call control by a call control device on the basis of location information of the terminals managed by a location management device connected to a network, comprising:

detecting a location registration request given to the call control device from a terminal;

notifying the call control device of the detected location registration request; and notifying the location management device connected to the network which is different from a network the call control device and the relay node connect of a registration information of the terminal including an address of the call control device which is an original destination of the detected location registration request.

21. The non-transitory recording medium according to claim 20, further comprising:

detecting a connecting status with the terminal; and notifying, if the connecting status with the terminal is changed, the call control device of an update of the location information.

22. The non-transitory recording medium according to claim 21, wherein on the occasion of notifying, a location management device managing the location information of the terminals is notified of the connecting status with the terminal, and the location management device is thereby made to notify the call control device of the update of the location information.

23. The non-transitory recording medium according to claim 21, wherein if cancellation of the connection with the terminal is detected, the call control device is notified of invalidity of the location information registered by the terminal by way of a notification of the update.

24. The non-transitory recording medium according to claim 21, wherein when connecting to the terminal, the call control device is notified of an update of the location information.

* * * * *